(12) United States Patent
Oberheide et al.

(10) Patent No.: US 10,021,113 B2
(45) Date of Patent: **\*Jul. 10, 2018**

(54) SYSTEM AND METHOD FOR AN INTEGRITY FOCUSED AUTHENTICATION SERVICE

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/661,277

(22) Filed: Jul. 27, 2017

(65) Prior Publication Data

US 2017/0339164 A1 Nov. 23, 2017

Related U.S. Application Data

(63) Continuation of application No. 14/688,893, filed on Apr. 16, 2015, now Pat. No. 9,762,590.

(Continued)

(51) Int. Cl.
*H04L 29/06* (2006.01)
*H04L 9/32* (2006.01)

(52) U.S. Cl.
CPC ............ *H04L 63/12* (2013.01); *H04L 9/3215* (2013.01); *H04L 9/3247* (2013.01); *H04L 63/0823* (2013.01); *H04L 63/18* (2013.01)

(58) Field of Classification Search
CPC ..... H04L 63/12; H04L 9/3247; H04L 9/3215; H04L 63/18; H04L 63/0823
See application file for complete search history.

(56) References Cited

U.S. PATENT DOCUMENTS 5,838,792 A 11/1998 Ganesan
5,870,723 A 2/1999 Pare, Jr. et al.
(Continued)

FOREIGN PATENT DOCUMENTS

EP 2639997 9/2013

OTHER PUBLICATIONS

Aloul S Zahidi; et al. "Two factor authentication using mobile phones," 2009 IEEE/ACS International Conference on Computer Systems and Applications, Rabat, 2009, pp. 641-644.
(Continued)

*Primary Examiner* — Joseph P Hirl
*Assistant Examiner* — J. Brant Murphy
(74) *Attorney, Agent, or Firm* — Jeffrey Schox; Padowithz Alce

(57) ABSTRACT

Systems and methods for authentication. At an authentication service, key synchronization information is stored for an enrolled authentication device for a user identifier of a service provider. The key synchronization information indicates that a private key stored by the authentication device is synchronized with a public key stored at the service provider. Responsive to an authentication request provided by the service provider for the user identifier, the authentication service determines an authentication device for the user identifier that stores a synchronized private key by using the key synchronization information, and provides the authentication request to the authentication device. The authentication service provides a signed authentication response to the service provider. The authentication response is responsive to the authentication request and signed by using the private key. The service provider verifies the signed authentication response by using the public key.

14 Claims, 15 Drawing Sheets

Related U.S. Application Data

(60) Provisional application No. 61/980,762, filed on Apr. 17, 2014.

(56) References Cited

U.S. PATENT DOCUMENTS

| | | | |
|---|---|---|---|
| 6,119,096 | A | 9/2000 | Mann et al. |
| 6,209,091 | B1 | 3/2001 | Sudia et al. |
| 6,311,272 | B1 | 10/2001 | Gressel |
| 6,694,025 | B1 | 2/2004 | Epstein et al. |
| 6,758,394 | B2 | 7/2004 | Maskatiya et al. |
| 6,823,359 | B1 | 11/2004 | Heidingsfeld et al. |
| 6,934,858 | B2 | 8/2005 | Woodhill |
| 6,956,950 | B2 | 10/2005 | Kausik |
| 6,996,716 | B1 | 2/2006 | Hsu |
| 7,000,247 | B2 | 2/2006 | Banzhof |
| 7,093,133 | B2 | 8/2006 | Hopkins et al. |
| 7,096,354 | B2 | 8/2006 | Wheeler et al. |
| 7,107,246 | B2 | 9/2006 | Wang |
| 7,146,009 | B2 | 12/2006 | Andivahis et al. |
| 7,172,115 | B2 | 2/2007 | Lauden |
| 7,331,518 | B2 | 2/2008 | Rable |
| 7,334,255 | B2 | 2/2008 | Lin et al. |
| 7,340,600 | B1 | 3/2008 | Corella |
| 7,349,929 | B2* | 3/2008 | Pfitzner .................. G06F 8/71 |
| 571,282 | A1 | 6/2008 | Takehiko et al. |
| 7,386,720 | B2 | 6/2008 | Sandhu et al. |
| 7,447,784 | B2 | 11/2008 | Eun |
| 7,463,637 | B2 | 12/2008 | Bou-Diab et al. |
| 7,496,662 | B1 | 2/2009 | Roesch et al. |
| 7,526,792 | B2 | 4/2009 | Ross |
| 7,562,382 | B2 | 7/2009 | Hinton et al. |
| 7,562,385 | B2 | 7/2009 | Thione et al. |
| 7,571,471 | B2 | 8/2009 | Sandhu et al. |
| 7,574,733 | B2 | 8/2009 | Woodhill |
| 7,599,493 | B2 | 10/2009 | Sandhu et al. |
| 7,630,493 | B2 | 12/2009 | Sandhu et al. |
| 7,711,122 | B2 | 5/2010 | Allen et al. |
| 7,716,240 | B2 | 5/2010 | Lim |
| 7,764,970 | B2 | 7/2010 | Neil et al. |
| 7,793,110 | B2 | 9/2010 | Durfee et al. |
| 7,836,501 | B2 | 11/2010 | Sobel et al. |
| 7,953,979 | B2 | 5/2011 | Borneman et al. |
| 7,958,362 | B2 | 6/2011 | Hwang |
| 7,961,645 | B2 | 6/2011 | Gudipudi et al. |
| 7,982,595 | B2 | 7/2011 | Hanna et al. |
| 7,983,987 | B2 | 7/2011 | Kranzley et al. |
| 8,010,779 | B2 | 8/2011 | Sermersheim et al. |
| 8,028,325 | B2* | 9/2011 | Cahill ................. G06Q 10/10 726/2 |
| 8,028,329 | B2 | 9/2011 | Whitcomb |
| 8,099,368 | B2 | 1/2012 | Coulter et al. |
| 8,136,148 | B1 | 3/2012 | Chayanam et al. |
| 8,141,146 | B2 | 3/2012 | Ozeki |
| 8,151,333 | B2 | 4/2012 | Zhu et al. |
| 8,161,527 | B2 | 4/2012 | Curren |
| 8,185,744 | B2 | 5/2012 | Brown et al. |
| 8,200,980 | B1 | 6/2012 | Robinson et al. |
| 8,225,392 | B2 | 7/2012 | Dubrovsky et al. |
| 8,245,044 | B2 | 8/2012 | Kang |
| 8,259,947 | B2 | 9/2012 | Rose et al. |
| 8,275,672 | B1* | 9/2012 | Nguyen ............. G06Q 30/0635 705/26.1 |
| 8,296,562 | B2 | 10/2012 | Williams et al. |
| 8,332,627 | B1 | 12/2012 | Matthews et al. |
| 8,335,933 | B2 | 12/2012 | Humphrey et al. |
| 8,340,287 | B2 | 12/2012 | Sandhu et al. |
| 8,340,635 | B2 | 12/2012 | Herz et al. |
| 8,380,192 | B2 | 2/2013 | Kim et al. |
| 8,381,297 | B2 | 2/2013 | Touboul |
| 8,397,301 | B2 | 3/2013 | Hering et al. |
| 8,402,526 | B2 | 3/2013 | Ahn |
| 8,418,168 | B2 | 4/2013 | Tyhurst et al. |
| 8,458,798 | B2 | 6/2013 | Williams et al. |
| 8,468,609 | B2* | 6/2013 | Leggette ............. G06F 11/1004 709/216 |
| 8,484,708 | B2 | 7/2013 | Chern |
| 8,495,720 | B2 | 7/2013 | Counterman |
| 8,499,149 | B2 | 7/2013 | Chen |
| 8,499,339 | B2 | 7/2013 | Chao et al. |
| 8,510,820 | B2 | 8/2013 | Oberheide et al. |
| 8,522,010 | B2 | 8/2013 | Ozzie et al. |
| 8,528,039 | B2 | 9/2013 | Chakarapani |
| 8,538,028 | B2 | 9/2013 | Yeap et al. |
| 8,539,544 | B2 | 9/2013 | Garimella et al. |
| 8,539,567 | B1 | 9/2013 | Logue et al. |
| 8,548,426 | B2 | 10/2013 | Smith |
| 8,549,601 | B2 | 10/2013 | Ganesan |
| 8,571,220 | B2 | 10/2013 | Ollikainen et al. |
| 8,578,162 | B2 | 11/2013 | Jentzsch et al. |
| 8,595,809 | B2 | 11/2013 | Chayanam et al. |
| 8,595,822 | B2 | 11/2013 | Schrecker et al. |
| 8,601,554 | B2 | 12/2013 | Gordon et al. |
| 8,612,305 | B2 | 12/2013 | Dominguez et al. |
| 8,627,438 | B1* | 1/2014 | Bhimanaik ............ H04L 63/10 726/9 |
| 8,646,060 | B1 | 2/2014 | Ayed |
| 8,646,086 | B2 | 2/2014 | Chakra et al. |
| 8,667,288 | B2 | 3/2014 | Yavuz |
| 8,689,287 | B2 | 4/2014 | Bohmer et al. |
| 8,700,729 | B2 | 4/2014 | Dua |
| 8,713,329 | B2 | 4/2014 | Schneider |
| 8,713,639 | B2 | 4/2014 | Cheeniyil et al. |
| 8,719,930 | B2 | 5/2014 | Lapsley et al. |
| 8,732,475 | B2 | 5/2014 | Fahrny et al. |
| 8,732,839 | B2 | 5/2014 | Hohl |
| 8,737,623 | B2 | 5/2014 | Hart |
| 8,745,703 | B2 | 6/2014 | Lambert et al. |
| 8,751,801 | B2 | 6/2014 | Harris et al. |
| 8,756,567 | B2 | 6/2014 | Jentsch et al. |
| 8,756,651 | B2 | 6/2014 | Baer et al. |
| 8,756,698 | B2 | 6/2014 | Sidagni |
| 8,763,077 | B2 | 6/2014 | Oberheide et al. |
| 8,806,609 | B2 | 8/2014 | Gladstone et al. |
| 8,850,516 | B1 | 9/2014 | Hrebicek et al. |
| 8,862,097 | B2 | 10/2014 | Brand et al. |
| 8,891,772 | B2 | 11/2014 | D Souza et al. |
| 8,893,230 | B2 | 11/2014 | Oberheide et al. |
| 8,898,762 | B2 | 11/2014 | Kang |
| 8,949,596 | B2 | 2/2015 | Yin et al. |
| 8,949,927 | B2 | 2/2015 | Arnott et al. |
| 8,966,587 | B2 | 2/2015 | Nair et al. |
| 8,984,276 | B2 | 3/2015 | Benson et al. |
| 9,037,127 | B2 | 5/2015 | Raleigh |
| 9,049,011 | B1 | 6/2015 | Agrawal |
| 9,049,594 | B2 | 6/2015 | Chen et al. |
| 9,071,611 | B2 | 6/2015 | Yadav et al. |
| 9,076,343 | B2 | 7/2015 | Chaar et al. |
| 9,110,754 | B2 | 8/2015 | Poonamalli et al. |
| 9,118,656 | B2 | 8/2015 | Ting et al. |
| 9,122,888 | B2 | 9/2015 | Devi |
| 9,124,582 | B2 | 9/2015 | Kalinichenko et al. |
| 9,135,458 | B1 | 9/2015 | Hankins, Jr. et al. |
| 9,154,387 | B2 | 10/2015 | Maki et al. |
| 9,189,491 | B2 | 11/2015 | Fushman et al. |
| 9,201,644 | B2 | 12/2015 | Klein et al. |
| 9,203,841 | B2 | 12/2015 | Neuman et al. |
| 9,223,961 | B1 | 12/2015 | Sokolov |
| 9,225,840 | B2 | 12/2015 | Malatack et al. |
| 9,253,185 | B2 | 2/2016 | Alaranta et al. |
| 9,258,296 | B2 | 2/2016 | Juthani |
| 9,270,663 | B2 | 2/2016 | Kravitz et al. |
| 9,282,085 | B2 | 3/2016 | Oberheide et al. |
| 9,338,156 | B2 | 5/2016 | Oberheide et al. |
| 9,338,163 | B2 | 5/2016 | Wendling et al. |
| 9,386,003 | B2 | 7/2016 | Kumar |
| 9,391,980 | B1 | 7/2016 | Krahn et al. |
| 9,418,213 | B1* | 8/2016 | Roth ..................... G06F 21/31 |
| 9,430,938 | B2 | 8/2016 | Proud |
| 9,443,084 | B2 | 9/2016 | Nice et al. |
| 9,479,509 | B2 | 10/2016 | Zeuthen |
| 9,659,160 | B2 | 5/2017 | Ligatti et al. |
| 9,668,137 | B2 | 5/2017 | Sigurdson et al. |
| 9,706,410 | B2 | 7/2017 | Sreenivas et al. |
| 2002/0013898 | A1 | 1/2002 | Sudia et al. |

(56) References Cited

U.S. PATENT DOCUMENTS

| | | | |
|---|---|---|---|
| 2002/0091745 A1* | 7/2002 | Ramamurthy | G06F 17/30867 718/100 |
| 2002/0136410 A1 | 9/2002 | Hanna | |
| 2003/0061506 A1* | 3/2003 | Cooper | H04L 41/069 726/4 |
| 2003/0115452 A1 | 6/2003 | Sandhu et al. | |
| 2003/0149781 A1* | 8/2003 | Yared | G06F 21/41 709/229 |
| 2004/0139318 A1* | 7/2004 | Fiala | G06Q 20/3558 713/165 |
| 2005/0097350 A1* | 5/2005 | Patrick | G06F 21/6218 726/26 |
| 2005/0097352 A1* | 5/2005 | Patrick | H04L 63/20 726/26 |
| 2006/0021018 A1* | 1/2006 | Hinton | H04L 63/06 726/10 |
| 2006/0031938 A1 | 2/2006 | Choi | |
| 2006/0059569 A1 | 3/2006 | Dasgupta et al. | |
| 2006/0075475 A1* | 4/2006 | Boulos | G06F 21/33 726/6 |
| 2006/0129817 A1* | 6/2006 | Borneman | G06F 21/41 713/170 |
| 2007/0027961 A1* | 2/2007 | Holzer | G06Q 30/02 709/219 |
| 2007/0101145 A1* | 5/2007 | Sachdeva | H04L 63/0815 713/176 |
| 2007/0143860 A1* | 6/2007 | Hardt | G06F 21/6254 726/28 |
| 2007/0204016 A1* | 8/2007 | Kunz | G06Q 10/06 709/223 |
| 2007/0250914 A1 | 10/2007 | Fazal et al. | |
| 2007/0254631 A1* | 11/2007 | Spooner | G06F 21/6218 455/411 |
| 2007/0284429 A1 | 12/2007 | Beeman | |
| 2007/0297607 A1 | 12/2007 | Ogura et al. | |
| 2008/0010665 A1* | 1/2008 | Hinton | G06F 21/41 726/1 |
| 2008/0028225 A1* | 1/2008 | Eckert | H04L 63/0869 713/182 |
| 2008/0059804 A1* | 3/2008 | Shah | G06F 21/41 713/186 |
| 2008/0120411 A1 | 5/2008 | Eberle | |
| 2008/0134311 A1* | 6/2008 | Medvinsky | G06F 21/33 726/7 |
| 2008/0201186 A1* | 8/2008 | Poon | G06Q 10/06375 705/14.69 |
| 2008/0229104 A1 | 9/2008 | Ju et al. | |
| 2009/0055906 A1 | 2/2009 | Von Wendorff | |
| 2009/0083225 A1* | 3/2009 | Jacobs | G06Q 30/02 |
| 2009/0198997 A1* | 8/2009 | Yeap | H04L 63/0823 713/155 |
| 2009/0254978 A1* | 10/2009 | Rouskov | G06F 21/335 726/4 |
| 2009/0271863 A1 | 10/2009 | Govindavajhala et al. | |
| 2009/0328178 A1* | 12/2009 | McDaniel | G06F 21/31 726/9 |
| 2010/0023781 A1 | 1/2010 | Nakamoto | |
| 2010/0036931 A1* | 2/2010 | Certain | G06F 11/1451 709/214 |
| 2010/0042954 A1 | 2/2010 | Rosenblatt et al. | |
| 2010/0100924 A1* | 4/2010 | Hinton | G06F 21/10 726/1 |
| 2010/0107225 A1* | 4/2010 | Spencer | H04L 63/0876 726/4 |
| 2010/0131755 A1* | 5/2010 | Zhu | H04L 63/0815 713/155 |
| 2010/0180001 A1 | 7/2010 | Hardt | |
| 2010/0186082 A1* | 7/2010 | Ladki | G06F 21/335 726/19 |
| 2010/0274859 A1 | 10/2010 | Bucuk | |
| 2010/0319068 A1* | 12/2010 | Abbadessa | H04L 63/08 726/21 |
| 2011/0026716 A1 | 2/2011 | Tang et al. | |
| 2011/0138469 A1 | 6/2011 | Ye et al. | |
| 2011/0179472 A1* | 7/2011 | Ganesan | G06F 21/42 726/6 |
| 2011/0197267 A1 | 8/2011 | Gravel et al. | |
| 2011/0219449 A1 | 9/2011 | St Neitzel et al. | |
| 2011/0225637 A1* | 9/2011 | Counterman | G06F 21/6245 726/7 |
| 2011/0231265 A1* | 9/2011 | Brown | G06Q 30/02 705/14.73 |
| 2011/0302410 A1 | 12/2011 | Clarke et al. | |
| 2012/0096274 A1 | 4/2012 | Campagna et al. | |
| 2012/0117229 A1* | 5/2012 | Van Biljon | G06Q 30/04 709/224 |
| 2012/0117626 A1* | 5/2012 | Yates | H04L 9/3213 726/4 |
| 2012/0131354 A1* | 5/2012 | French | G06F 21/602 713/189 |
| 2012/0151567 A1* | 6/2012 | Chayanam | G06F 21/31 726/7 |
| 2012/0227098 A1 | 9/2012 | Obasanjo et al. | |
| 2012/0254957 A1* | 10/2012 | Fork | G06F 21/33 726/6 |
| 2012/0278454 A1* | 11/2012 | Stewart | H04L 67/34 709/220 |
| 2013/0060708 A1 | 3/2013 | Oskolkov et al. | |
| 2013/0067538 A1* | 3/2013 | Dharmarajan | G06F 21/45 726/4 |
| 2013/0086210 A1* | 4/2013 | Yiu | G06F 21/41 709/217 |
| 2013/0086658 A1* | 4/2013 | Kottahachchi | G06F 21/45 726/6 |
| 2013/0110676 A1 | 5/2013 | Kobres | |
| 2013/0125226 A1 | 5/2013 | Shah et al. | |
| 2013/0239168 A1 | 9/2013 | Sreenivas et al. | |
| 2013/0246281 A1* | 9/2013 | Yamada | G06F 21/31 705/71 |
| 2013/0263211 A1* | 10/2013 | Neuman | H04L 63/08 726/1 |
| 2013/0276142 A1* | 10/2013 | Peddada | G06F 21/62 726/28 |
| 2013/0311776 A1* | 11/2013 | Besehanic | H04L 9/3247 713/168 |
| 2014/0020051 A1* | 1/2014 | Lu | G06F 21/6218 726/1 |
| 2014/0181517 A1* | 6/2014 | Alaranta | H04L 63/062 713/168 |
| 2014/0181520 A1* | 6/2014 | Wendling | G06Q 20/3572 713/169 |
| 2014/0201841 A1 | 7/2014 | Deshpande et al. | |
| 2014/0208405 A1 | 7/2014 | Hashai | |
| 2014/0244993 A1 | 8/2014 | Chew | |
| 2014/0245278 A1 | 8/2014 | Zellen | |
| 2014/0351954 A1 | 11/2014 | Brownell et al. | |
| 2015/0312233 A1* | 10/2015 | Graham, III | H04L 9/006 713/171 |
| 2016/0056962 A1 | 2/2016 | Mehtälä | |
| 2016/0164866 A1 | 6/2016 | Oberheide et al. | |
| 2016/0286391 A1 | 9/2016 | Khan | |
| 2016/0366589 A1 | 12/2016 | Jean | |

OTHER PUBLICATIONS

Bonneau Joseph; et al. "Passwords and the evolution of imperfect authentication." Communications of the ACM 58.7 (2015): 78-87.

Kher Vishal; et al. "Securing distributed storage: challenges, techniques and systems." Proceedings of the 2005 ACM workshop on Storage security and survivability. ACM, 2005, pp. 9-25.

Edge, Kenneth, et al. "The use of attack and protection trees to analyze security for an online banking system." System Sciences, 2007. HICSS 2007. 40th Annual Hawaii International Conference on. IEEE, 2007.

Goldfeder et al., Securing Bitcoin wallets via a new DSA/ECDSA threshold signature scheme, http://www.cs.princeton.edu/~stevenag/threshold_sigs.pdf.

(56) References Cited

OTHER PUBLICATIONS

Neuenhofen, Kay, and Mathew Thompson. "A secure marketplace for mobile java agents." Proceeding of the second international Conference on Autonomous agents. ACM, 1998. (pp. 212-218).
Simske et al., "APEX: Automated Policy Enforcement eXchange", Sep. 21-24, 2010, ACM, pp. 139-142.
Symantec, Administration guide for symantec Endpoint protection and symantec network access control, 2009, version 11.00.05.00.00.
Symantec, Administration Guide for Symantec TM Endpoint Protection and Symantec Network Access Control, Aug. 1, 2007.

* cited by examiner

SYSTEM AND METHOD FOR AN INTEGRITY FOCUSED AUTHENTICATION SERVICE

CROSS-REFERENCE TO RELATED APPLICATIONS

This application claims the benefit of U.S. patent application Ser. No. 14/688,893, filed 16 Apr. 2015, which claims the benefit of U.S. Provisional Application Ser. No. 61/980,762, filed on 17 Apr. 2014, which is incorporated in its entirety by this reference.

TECHNICAL FIELD

This invention relates generally to the authentication field, and more specifically to a new and useful system and method for an integrity focused authentication service in the authentication field.

BACKGROUND

Authentication services can be used by service providers to facilitate authenticating and authorizing users within the service provider. The service provider can delegate at least a portion of authentication to the authentication service. The authentication service then will return some response indicating if the authentication/authorization process of the authentication service was successful. The service provider, trusting that response, can take an appropriate action. However, if the authentication service is compromised or not a trustful entity, the response may be falsified, potentially confirming or denying auth requests. Thus, there is a need in the authentication field to create a new and useful system and method for an integrity focused authentication service. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The system and method function to provide a convenient mechanism for authentication/authorization to a service provider while preserving security considerations such as integrity, confidentiality, and optionally availability. The system and method of a preferred embodiment are implemented in combination with at least one service provider and at least one client device. The system and method can function to maintain and operate the mechanics and business logic of providing an authentication service. The system and method are preferably used to provide a two-factor authentication service, which can rely on a user device, a physical token, one-time password coordination, biometric based secondary authentication, and/or any suitable form of authentication. The system and method can similarly be applied to any suitable form of multi-factor authentication. The service provider delegates or offloads the task of developing, managing, and executing a substantial portion of multi-factor authentication to that of the system.

The system and method facilitate synchronization between a service provider and client devices to reduce or eliminate the possibilities of the state of an authentication service compromising the security state of the service provider. With regard to integrity, the client device service provider synchronization can enable a service provider capability to verify the response of a client device without relying on trust of the authentication service—the authentication service (if corrupted or malicious) would be prevented from issuing wrong or faked responses to an auth requests. With regard to confidentiality, requests and sensitive data can be secured as the data is passed through the authentication service—the authentication service can continue to provide additional layers of security agnostic to underlying data. With regard to availability, the system and method may optionally be implemented on-premise or otherwise outside a dedicated remote service—the uptime of a multitenant authentication service would not determine the uptime of authentication operations of the service provider. The system and method accordingly can preferably facilitate easier authentication and security added features while not forcing service providers to place continued trust in the authentication service. The service provider can use the authentication service in substantially a trust-on-first-use mode of operation with a facilitated one-time binding/synchronization between a user device and the service provider.

Figure 1:
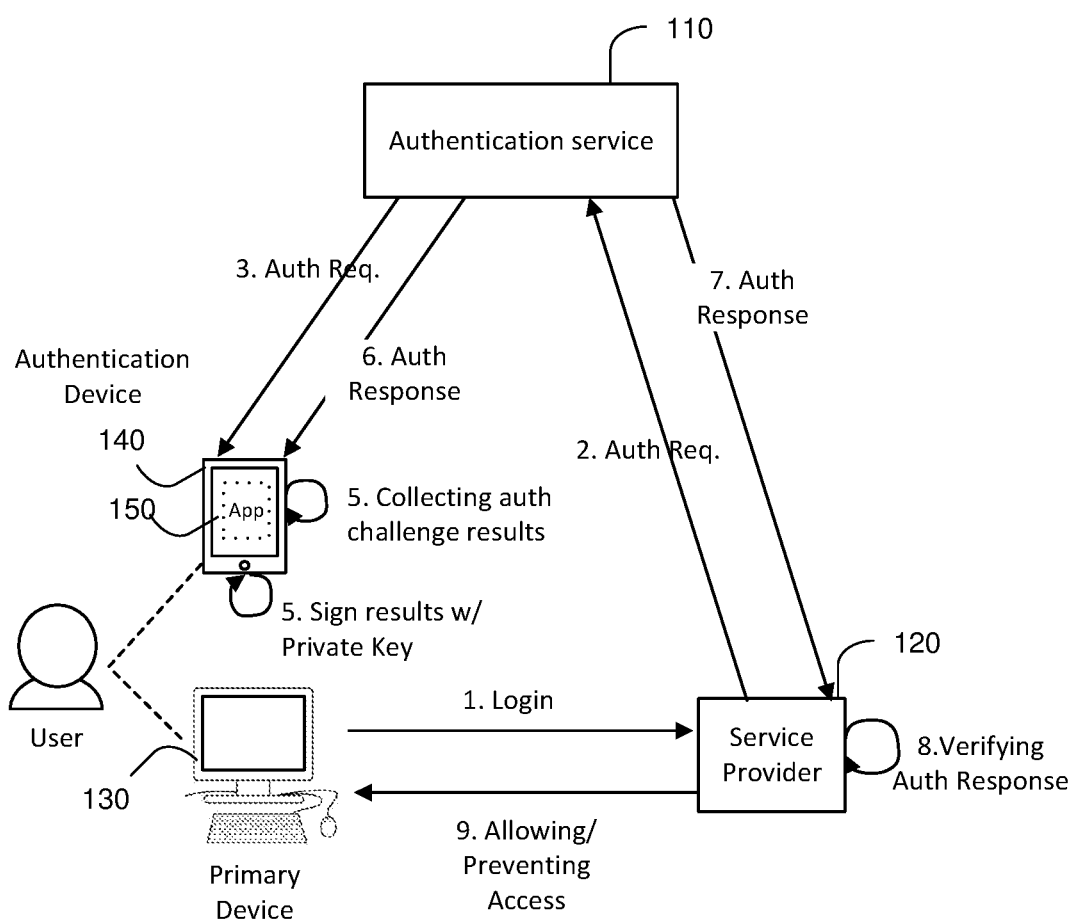
FIG. 1 is a schematic representation of a system and method of a preferred embodiment.

As shown in FIG. 1, a system of a preferred embodiment preferably includes an authentication service platform 110. The authentication service platform is preferably a multi-tenant authentication service hosted in a distributed computing infrastructure. The authentication service is preferably a service used by a service provider to supplement or provide a layer of authentication (or optionally authorization) to the service provider system. The authentication service platform is preferably configured to execute the steps of the method described below. The authentication service can facilitate synchronization and binding of tokens between a service provider and an authentication device of a user. The authentication service further facilitates receiving authentication requests from a service provider, determining how to route the request, delivering the request, and communicating any received responses from the authentication device to the service provider. In a preferred embodiment, the authentication service makes no final affirmation of the success of the auth request. The authentication service may supplement a secured affirmation with information such as reasons why the results of the affirmation should not be trusted. The authentication service can be used by a plurality of different service providers (e.g., the service provider 120 of FIG. 1), and each service provider will typically include a plurality of different users that can be authenticated through the authentication service. The authentication service preferably includes an account system to store and manage associations between a user identifier, and one or more authentication devices. The authentication service can additionally include device messaging engines to communicate with the various authentication devices. The device messaging engines could include sub-systems for sending SMS or MMS messages, making outbound phone calls, pushing notifications to client application instances on an authentication device, or employing any suitable form of communication with the authentication device.

The authentication service may alternatively be implemented as a dedicated on-premise system, which can function to decouple a service provider from dependence on availability of a remote authentication service. The on-premise authentication service can be substantially similar to the remote multitenant authentication server including device messaging engine and an account system to manage mapping of an authentication device to a user identifier.

The authentication service can additionally include additional layers of security that automatically supply security signals around the authentication request and responses passed through the authentication service. The additional layers of security are preferably not used to positively indicate success of authentication but can be used in preventing authentication if any malicious activity is detected. One exemplary layer of security includes service provider anomaly detection and authentication device anomaly detection. The anomaly detection layer can identify unexpected patterns in where, how, and what is communicated through the authentication service. For example, if the device and location information of a device authentication application suddenly deviants from normal behavior, the authentication service can prevent authentication for a particular request. Another security layer variation can include a device compliance layer that can function to enforce policy according to the conditions of the authentication device. The policy compliance can be based on a vulnerability assessment used in determining the health and security level of the device. For example, the vulnerability can be used to detect if the authentication device has a known security vulnerability or exploit.

The system can additionally include a device authentication application (e.g., the device authentication application 150 of FIG. 1). The device authentication application is preferably installed as an application instance of an authentication device (e.g., the authentication device 140 of FIG. 1) of a user. An authentication device is preferably a mobile computing device such as a smart phone, a tablet, or a wearable computer, which a user will have position of while attempting to authenticate with the service provider. However, the authentication device may alternatively be a dedicated authentication device, a desktop computer, or any suitable computing device. The authentication device is preferably distinct from a primary user device (e.g., the primary user device 130 of FIG. 1) used to access the service provider. In an alternative use case, the primary user device and the authentication device are the same, but preferably the user accesses the service provider through a first application instance (e.g., a web browser) and the additional authentication layer is performed through a distinct second application instance (e.g., a dedicated authentication application or OS based application). The device authentication application can function to receive, display, and prepare a response to an authentication request. The device authentication application can additionally be configured with a synchronized security token. The synchronized security token can be a private key of an asymmetric key pair, which may be used in decrypting data passed in the authentication request and in encrypting an authentication response. The synchronized token enables the authentication service to manage authentication without taking ownership of the core signal of authentication, the challenge result captured on the authentication device.

As an additional or alternative variation, a device authentication application SDK can be included such that routines and services provided by a dedicated device authentication application can be added to third party application instances. In yet another variation, the device authentication application could be an operating system based service that is included within the device and does not require explicit download of an application by a user.

The involved service providers can be any suitable computing system, platform, device, or computing infrastructure. A service provider will preferably have an internal or primary mode of authentication such as a username and password system. The service provider can use a set of APIs and SDKs provided by the system to integrate a second layer of authentication. The service provider will additionally preferably manage a synchronized token for the set of users with the second layer of authentication enabled. The synchronized token is preferably a public key of an asymmetric key pair (wherein a device authentication application instance of the user stores the corresponding private key). The synchronized token can be used in encrypting sensitive data in an authentication request and in decrypting and verifying the authentication response. After decrypting an authentication response, the service provider can determine the success or failure of the secondary layer of authentication without depending on trusting the authentication service.

Figure 2:
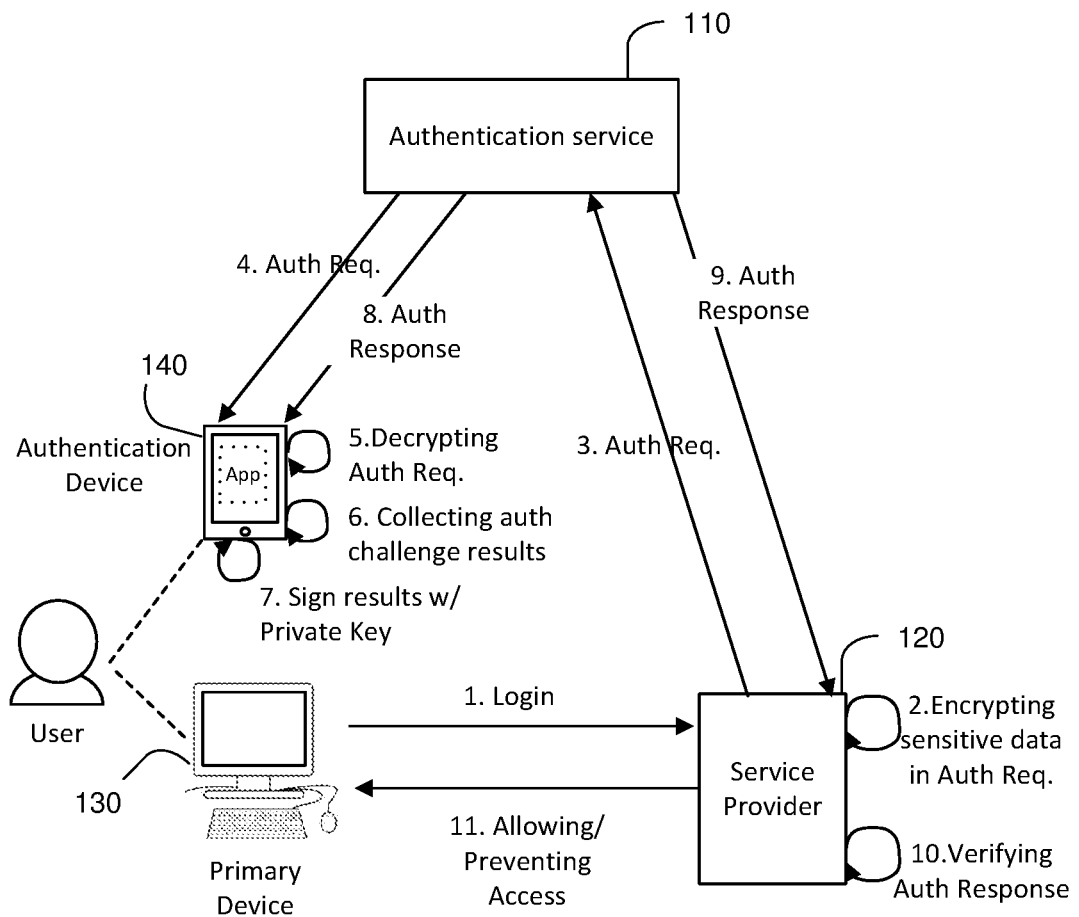
FIG. 2 is a schematic representation of a confidentiality variation of a preferred embodiment.

As shown in FIG. 2, a method of a preferred embodiment can include synchronizing keys between a service provider and at least one authentication device S110, receiving an authentication request S120, mapping the authentication request to an authentication device S130, delivering the authentication request S140, and delivering the authentication response to the service provider S150. The method preferably functions to facilitate authentication while allowing a service provider to maintain security integrity within his own system as shown in FIG. 1. The method preferably includes the response collected at an authentication device to be securely passed through the authentication service and verified at the service provider. The method may additionally include the authentication request to be transmitted through the authentication service to the authentication device while preserving security confidentiality of metadata related to the authentication request as shown in FIG. 2. The method preferably employs a trust on first use approach to providing authentication as a service wherein the authentication service is trusted to establish a cryptographic binding between an authentication device and the service provider for each selected user account.

Figure 3:
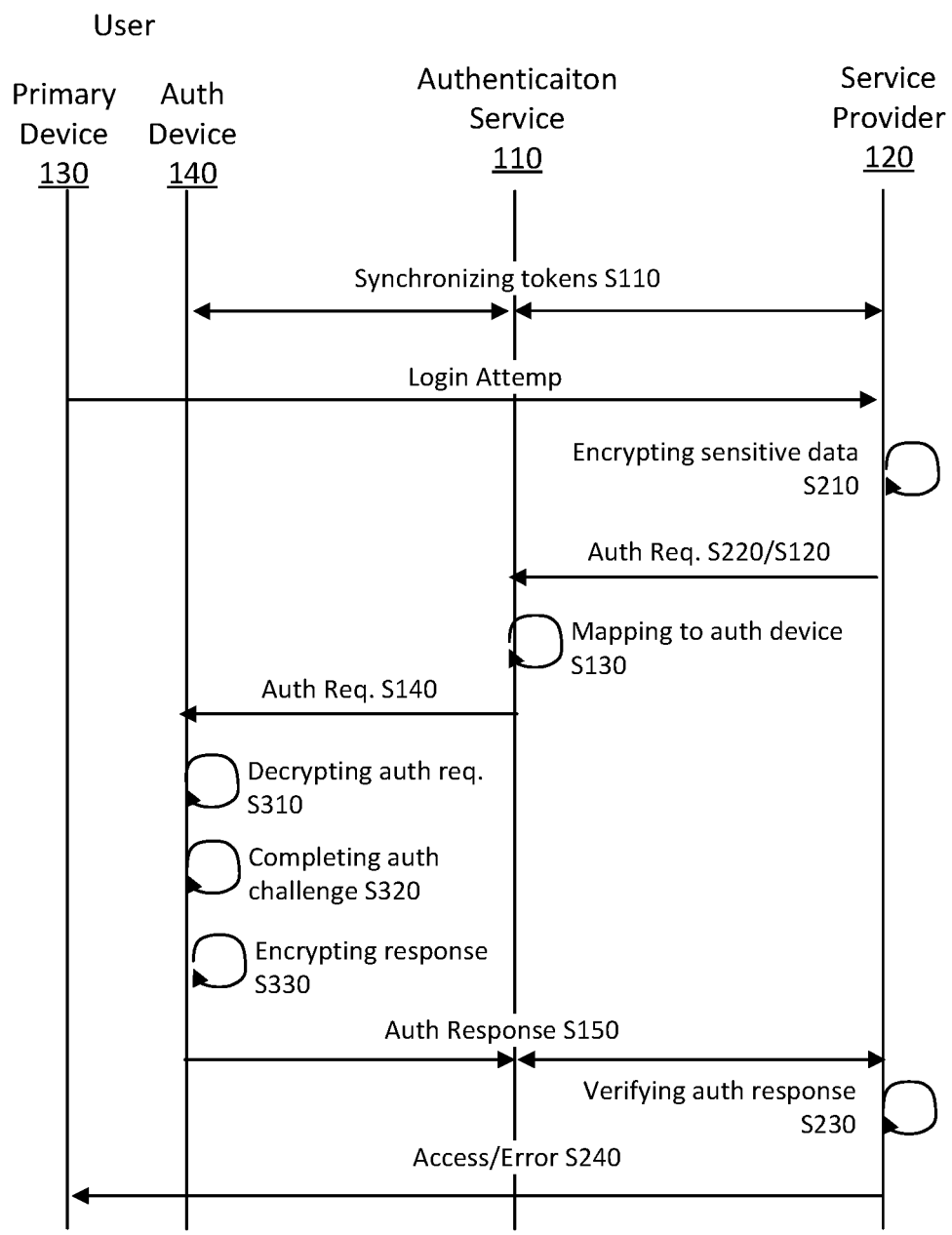
FIG. 3 is a communication flow representation of an implementation of the method.

The method is preferably executed by one of the system variations described above, but may alternatively be implemented by any suitable entity. The method is preferably performed within an authentication flow involving operation blocks performed at an authentication device and at a service provider. As shown in FIG. 3, an exemplary operational implementation including the method and operations of the service provider and the authentication device can include: synchronizing keys between a service provider and at least one authentication device S110; at a service provider, using a synchronized key (e.g., a public key) to encrypt data of the authentication request S210 and transmitting the authentication request to the authentication service specifying a user identifier S220; at the authentication service, receiving the authentication request S120, mapping the authentication request to an authentication device based on the user identifier S130, delivering the authentication request to the authentication device S140; at the authentication device, interpreting the authentication request with a synchronized token (e.g., a private key pair) S310, obtaining completion of an authentication challenge (e.g., user input, pin code collection, biometric signal reading, etc.) S320, encrypting the authentication challenge result in an authentication response and transmitting the authentication response S330; at the authentication service, receiving the authentication response and transmitting the authentication response to the service provider S150; and at the service provider, decrypting the authentication result with the synchronized token S230 and acting on the result of the authentication response (e.g., allowing or denying authentication) S240.

Block S110, which includes synchronizing keys between a service provider and at least one authentication device, functions to establish mechanism of trust between an authentication device of a user and a service provider. Each user of a service provider preferably has an associated synchronized token pairs (at least of the users that use the authentication layer provided by the authentication service). The synchronized tokens are preferably an asymmetrical key pair. The private key is preferably stored at the authentication device, and the public key is preferably stored in an account database of the service provider, where the account database maintains an association between the user and the public key. A service provider will preferably initially configure a managing account within the authentication service, with which the service provider can make API requests to the authentication service. Once, communication channels are configured between the authentication device, the authentication service, and the service provider, the authentication service can generate a set of tokens and deliver the tokens or keys to the authentication device and the service provider. In an alternative implementation, the service provider may generate and distribute the tokens. In yet another variation, a first asymmetric key pair is generated on the authentication device and the public key is passed through the authentication service to the service provider. Additionally, a second asymmetric key pair can be generated on the service provider and the public key is passed through the authentication service to the authentication device so that messages can be encrypted and verified in either direction.

Users can be enrolled into the authentication service in a number of different ways. Enrolling preferably establishes the communication between the authentication service and the authentication device. In a first variation, a user self-enrolls in the authentication service. Self-enrollment can include registering through an account portal of the authentication service. Registering preferably includes creating a user account linked to one or more user identifiers. For example, an email address or username may be used as a user identifier within the authentication service and the service provider. Registering additionally includes providing communication addressing such as a phone number. Enrollment may alternatively be partially or fully facilitated by the service provider by using APIs to coordinate enrollment of an authentication device.

Block S120, which includes receiving the authentication request, functions to obtain a request to authenticate a particular user on behalf of a service provider. The service provider is preferably indicated in an account identifier in the API request. The service provider can submit an authentication request after a primary layer of authentication is completed within the service provider. The service provider may alternatively submit the authentication request as a primary form of authentication. The service provider can alternatively submit the authentication request when performing an action requiring heighted authentication or authorization validation. The authentication request preferably specifies a user identifier. The authentication request can additionally include metadata concerning the authentication request such as time, location, and context relating to the authentication request. As described below, some or part of the data may be encrypted by the service provider with a token synchronized with the authentication device.

Block S130, which includes mapping the authentication request to an authentication device based on the user identifier, functions to select a proper authentication device and/or authentication application instance as the destination for the authentication request. The user identifier can be a username, a password, a code, or any suitable identifier linked to one or more authentication devices. In one variation, the mapping is one to one. In another variation, a user identifier can map to more than one authentication devices and/or authentication application instances. For example, one authentication device can be used as a primary auth endpoint and a second authentication device can be a fallback auth endpoint. In another example, one authentication device can be used as an authentication endpoint and a second authentication device can be an authorization endpoint. Once an authentication device is selected through the mapping, the authentication response is preferably delivered in block S140. Delivering the authentication request can be performed over any suitable protocol or in any suitable medium. Preferably, a push notification is sent to an application instance, which then can optionally decrypt any encrypted data and execute an auth challenge. The authentication request can alternatively be sent in an SMS message, MMS message, email, in-app messaging protocol, or any suitable communication channel.

At the authentication device, the authentication request is received from the authentication service. The contents of the authentication response are preferably used in completing an authentication challenge. An authentication challenge can include presenting information from the request (e.g., when and where the auth request originated), and then obtaining a confirmation result, cancellation result, fraud result, or any suitable form of user classification of the request. User input can alternatively include a pincode, a challenge question response, or any suitable response using knowledge as an identifying factor. An alternative authentication challenge can include collecting a signature from the device such as a biometric signature, a device stored token, a device profile signature, a hardware token, and/or any suitable input to complete an auth challenge.

As one possible variation, the method can enable confidentiality of the data passed within the authentication device. The data of authentication request can be encrypted at the service provider. The public key associated with the user identifier is preferably used to encrypt the metadata or optionally a portion of the metadata as shown in FIG. 2. For example, if the service provider is submitting an authentication request for a financial transaction. The details of the transaction can be submitted with the request so that they can be interpreted and displayed at the authentication device, but the details are not accessible by the service provider. A portion of the metadata can be exposed, which may be used by the authentication service to provide supplemental layer of security such as fraud detection. When the authentication request is received at the authentication device, the contents can be interpreted, all or only the encrypted portion can be decrypted with the synchronized token. Preferably, the private key accessible at the authentication device is used to decrypt the data.

Block S330, which includes the authentication device encrypting the authentication challenge result in an authentication response and transmitting the authentication response S330, functions to cryptographically sign the results of the authentication challenge to ensure the integrity of the response contents when received at the service provider. The authentication device preferably uses the private key of the authentication device. The authentication response can be transmitted or otherwise communicated to the authentication service through the same communication channel through which the authentication request was received. Alternatively, an alternative mode of communication can be used.

Block S150, which includes receiving the authentication response and transmitting the authentication response to the service provider, functions to reroute or redirect the authentication response to the corresponding service provider. The authentication response preferably includes at least one property that includes the encrypted authentication challenge response. The authentication service is preferably prevented from modifying the challenge response portion of the authentication response to indicate a confirmation. The service provider is able to verify the results as signaled by the authentication challenge without trusting the authentication service.

Figure 4:
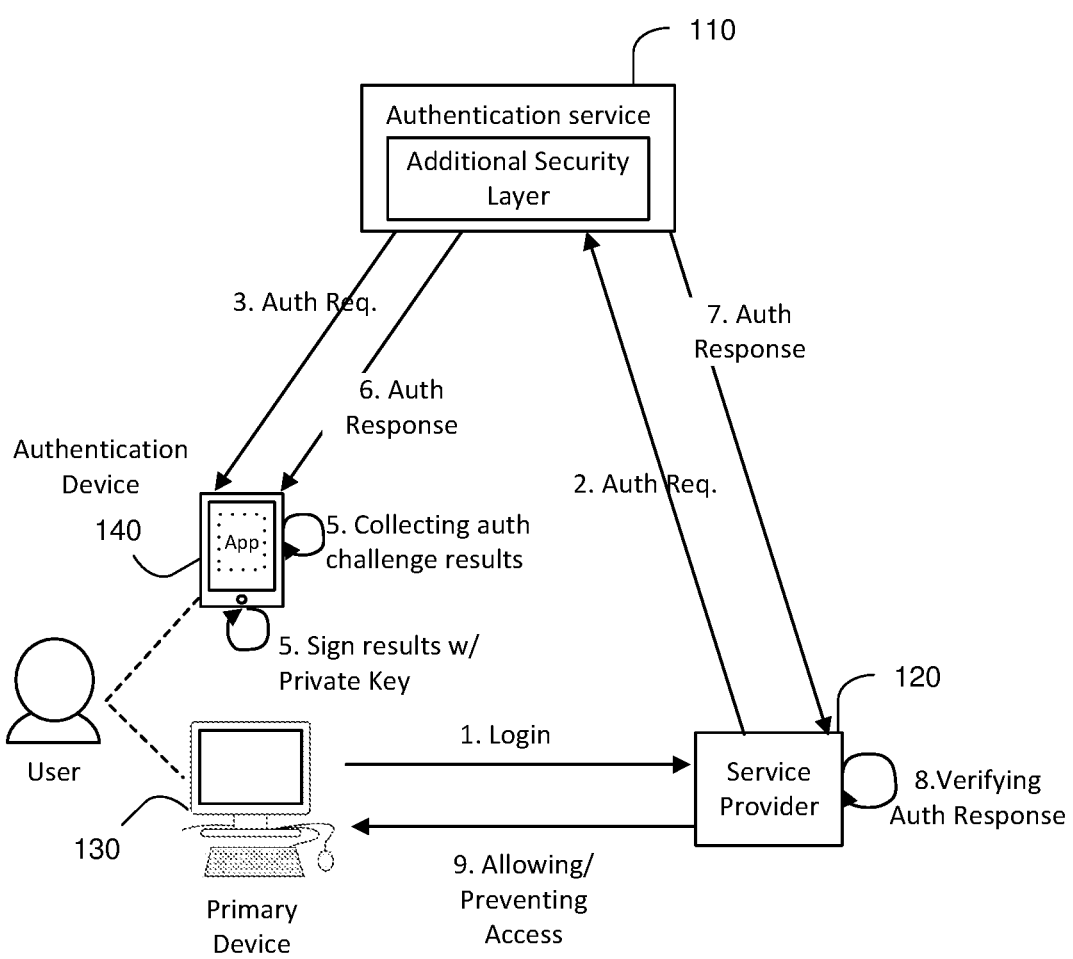
FIG. 4 is a schematic representation of a variation with an additional security layer.

As mentioned above, the method can include augmenting the authentication response with an additional layer of security as shown in FIG. 4. The additional layer of security is preferably a service that can detect and flag abnormal or fraudulent behavior or patterns. As one mode of operation, patterns in the type, number, frequency, properties, and other suitable aspects of authentication requests and the responses can be monitored. As another mode of operation, the state of the authentication device can be verified. State of the authentication device can include device-fingerprinting information collected at the authentication device and communicated to the authentication device. State of the authentication device can additionally or alternatively include a vulnerability assessment performed on the authentication device or possibly in coordination with a remote vulnerability assessment service. Vulnerability assessment can detect if the authentication device is susceptible to a number of attacks or has active malicious code. If usage occurs that is outside of normal operation patterns, the authentication can be flagged as suspicious or even marked as an invalid authentication request or response. If the request is flagged (possibly of irregularities in how the authentication request was received at the authentication service), the authentication device can alert a user to the possibility of a fraudulent request. Additional actions may be required of the user to confirm a flagged authentication request to indicate it is indeed legitimate. If the authentication response is flagged, the authentication challenge property may be maintained but an additional parameter can be set to alert the service provider of any alerts. In one alternative, the authentication challenge property can be modified to forcibly prevent confirmation of the authentication request.

Blocks S230 and S240, which include decrypting the authentication result with the synchronized token and acting on the result of the authentication response, function to interpret the authentication response at the service provider. The service will preferably use the public key stored in association with the user to verify the authentication response and to determine the results of the authentication challenge. The service provider will preferably allow the action if the authentication challenge property confirms the authentication request and if there are no other flags in the authentication response. In other cases, the authentication challenge property can indicate the request was cancelled (e.g., the user changed his mind) or the request was marked as fraud. If canceled, the service provider can return an error or request cancellation prompt to the user making the request through the service provider. If marked as fraud, the service provider can take any suitable action such as suspending other actions on the account or alerting the user of the fraudulent attempt.

Methods

Figure 5:
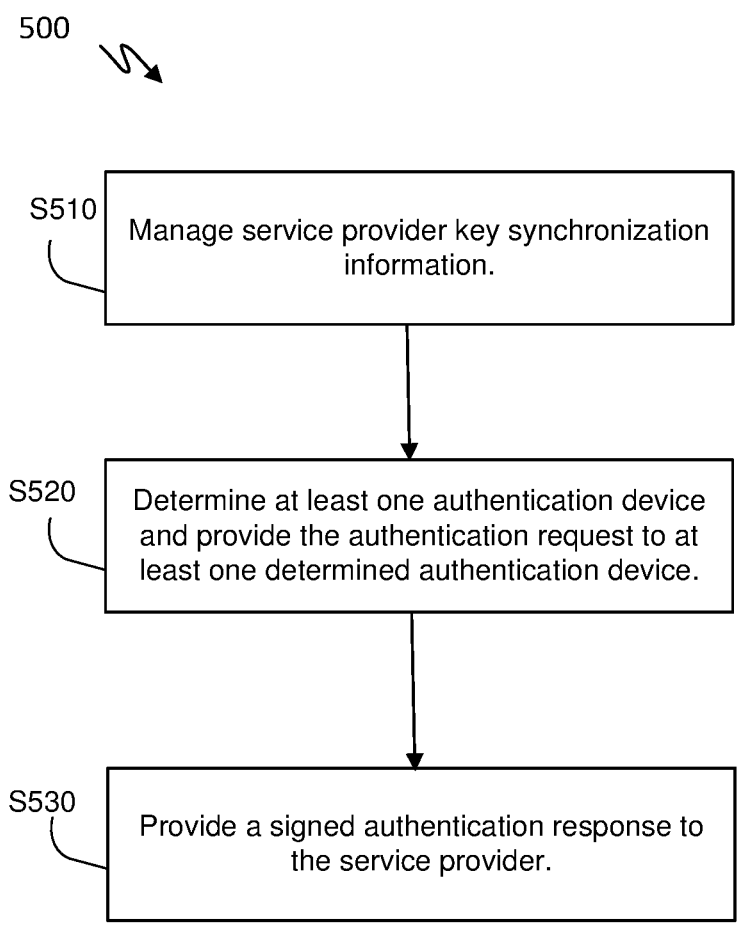
FIG. 5 is a chart view of a method of an embodiment.

As shown in FIG. 5, a method 500 for authentication at an authentication service (e.g., 110 of FIG. 1) in accordance with an example embodiment includes: managing service provider key synchronization information for at least one authentication device (e.g., the authentication device 140 of FIG. 1) that is enrolled at the authentication service for a user identifier of a service provider (e.g., the service provider 120 of FIG. 1), wherein for each authentication device the key synchronization information indicates that a private key associated with the user identifier and stored by the authentication device is synchronized with a public key stored at the service provider in association with the user identifier (process S510); responsive to an authentication request provided by the service provider for the user identifier, determining at least one authentication device (e.g., the authentication device 140 of FIG. 1) for the user identifier that stores a private key that is synchronized with the service provider by using the key synchronization information, and providing the authentication request to at least one determined authentication device (e.g., the authentication device 140 of FIG. 1) (process S520); and providing an authentication response signed by at least one determined authentication device to the service provider, the authentication response being responsive to the authentication request and being signed by using the private key (process S530). The authentication request is for a request received at the service provider from a primary device (e.g., the primary device 130 of FIG. 1) associated with the user identifier, and the service provider verifies the signed authentication response by using the public key.

In the example embodiment of FIG. 5, the method 500 of FIG. 5 is implemented by the authentication service 110. In some embodiments, the method of FIG. 5 is implemented by the service provider 120. In some embodiments, the method of FIG. 5 is implemented by the authentication device 140. In some embodiments, the method of FIG. 5 is implemented in any suitable type of authentication service platform. In some implementations, the process S510 is performed by a key synchronization module (e.g., the key synchronization module 1131 of FIG. 11) of the authentication service. In some implementations, the process S520 is performed by an authentication module (e.g., the authentication module 1132 of FIG. 11) of the authentication service. In some implementations, the process S530 is performed by the authentication module (e.g., the authentication module 1132 of FIG. 11) of the authentication service.

In some implementations, the authentication service 110 is a multi-factor authentication service. In some implementations, the authentication service 110 is a multi-tenant authentication service that is external to the service provider 120. In some implementations, the service provider 120 communicates with the authentication service 110 via a REST API. In some implementations, each authentication device (e.g., the authentication device 140 of FIG. 1) includes a device authentication application (e.g., the device authentication application 150 of FIG. 1) that is constructed to communicatively couple with the authentication service 110. In some implementations, the authentication service 110 manages the authentication service account information for the service provider (e.g., the service provider 120), and the service provider uses the authentication service account information to provide the authentication request to the authentication service. In some implementations, the authentication service 110 is a multi-tenant authentication service, the authentication service 110 manages the authentication service account information for the service provider (e.g., the service provider 120), and the service provider provides the authentication service account information as a parameter in an authentication request to the authentication service in accordance with a REST API of the authentication service 110.

Methods: Managing Key Synchronization Information

Process S510, which includes managing service provider key synchronization information for at least one authentication device that is enrolled at the authentication service for a user identifier of a service provider, functions to control the authentication service 110 to manage service provider key synchronization information for at least one authentication device that is enrolled at the authentication service for a user identifier of a service provider. For each authentication device, the key synchronization information indicates that a private key associated with the user identifier and stored by the authentication device is synchronized with a public key stored at the service provider in association with the user identifier.

In some implementations, the authentication service 110 manages the service provider key synchronization information for each authentication device (e.g., the authentication device 140 of FIG. 1) in association with: address information of the authentication device, the user identifier, and authentication service account information for the service provider.

Methods: Generation of Key Synchronization Information

Figure 6:
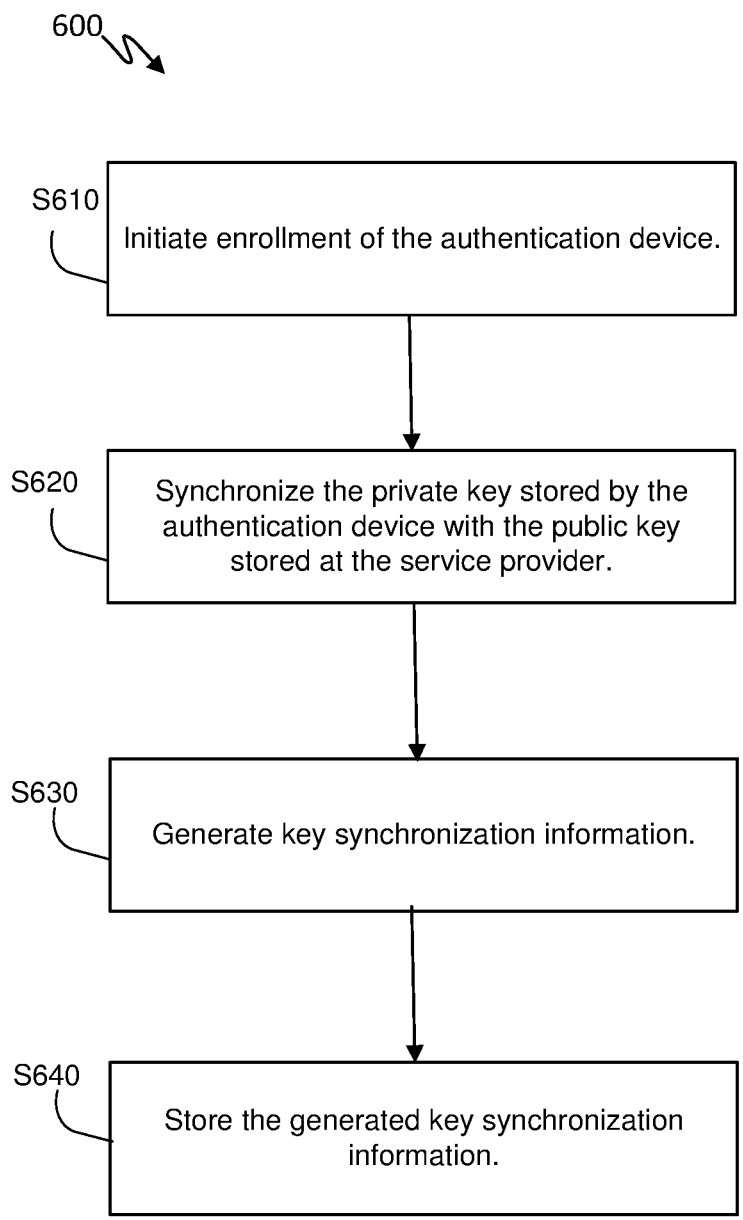
FIG. 6 is a chart view of a method of an embodiment.

As shown in FIG. 6, a method 600 for generation of key synchronization information for an authentication device in accordance with an example embodiment includes: initiating enrollment of the authentication device (process S610); synchronizing the private key stored by the authentication device with the public key stored at the service provider (process S620); generating key synchronization information that indicates that the private key is synchronized with the public key (process S630) and storing the generated key synchronization information (process S640).

In some implementations, enrollment is initiated (process S610) by the authentication device (e.g., 140). In some implementations, enrollment is initiated (process S610) by the service provider (e.g., 120). In some implementations, enrollment is initiated (process S610) by the primary device (e.g., 130).

Figure 8:
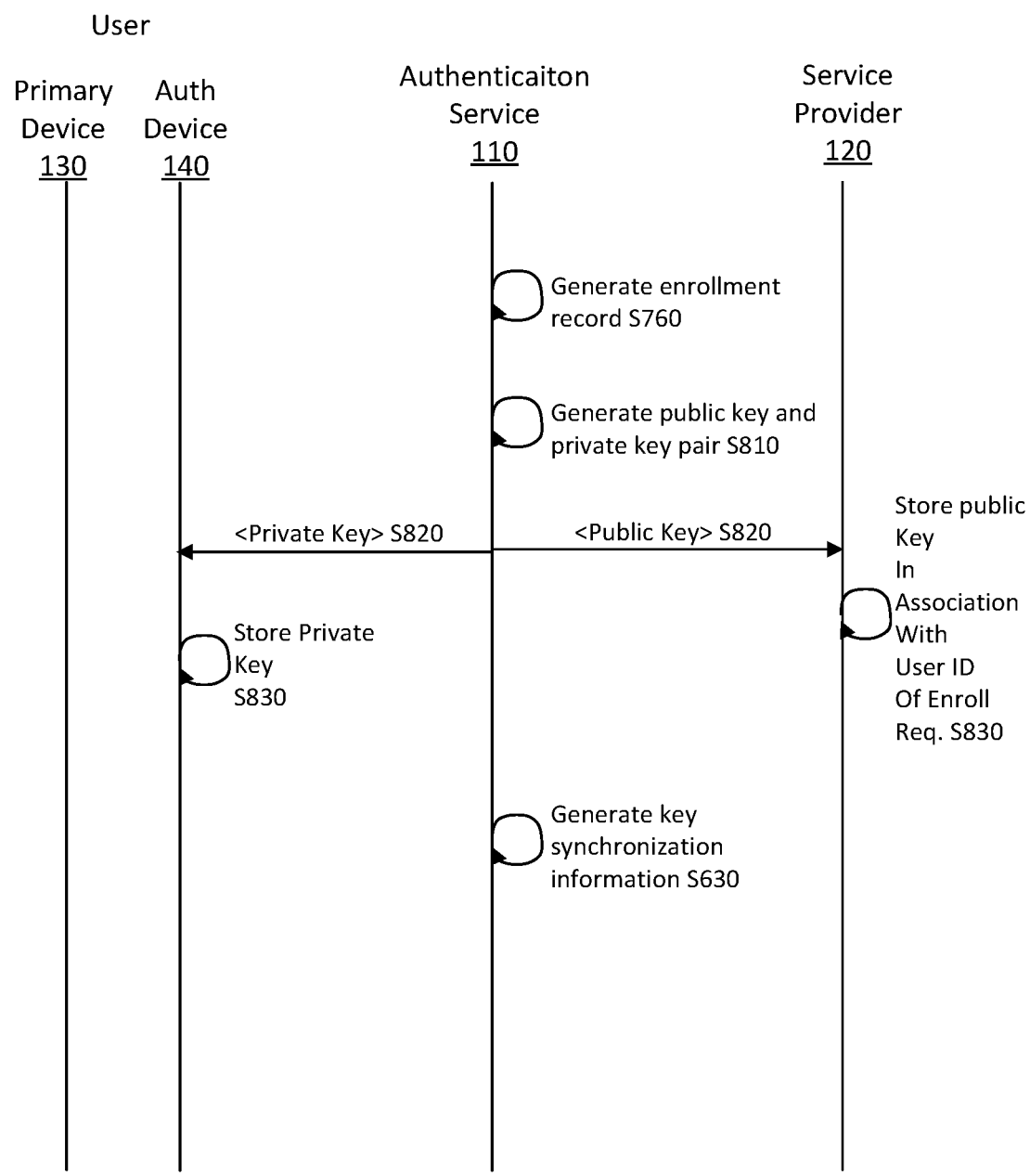
FIG. 8 is a communication flow representation of a method of an embodiment.
Figure 9A:
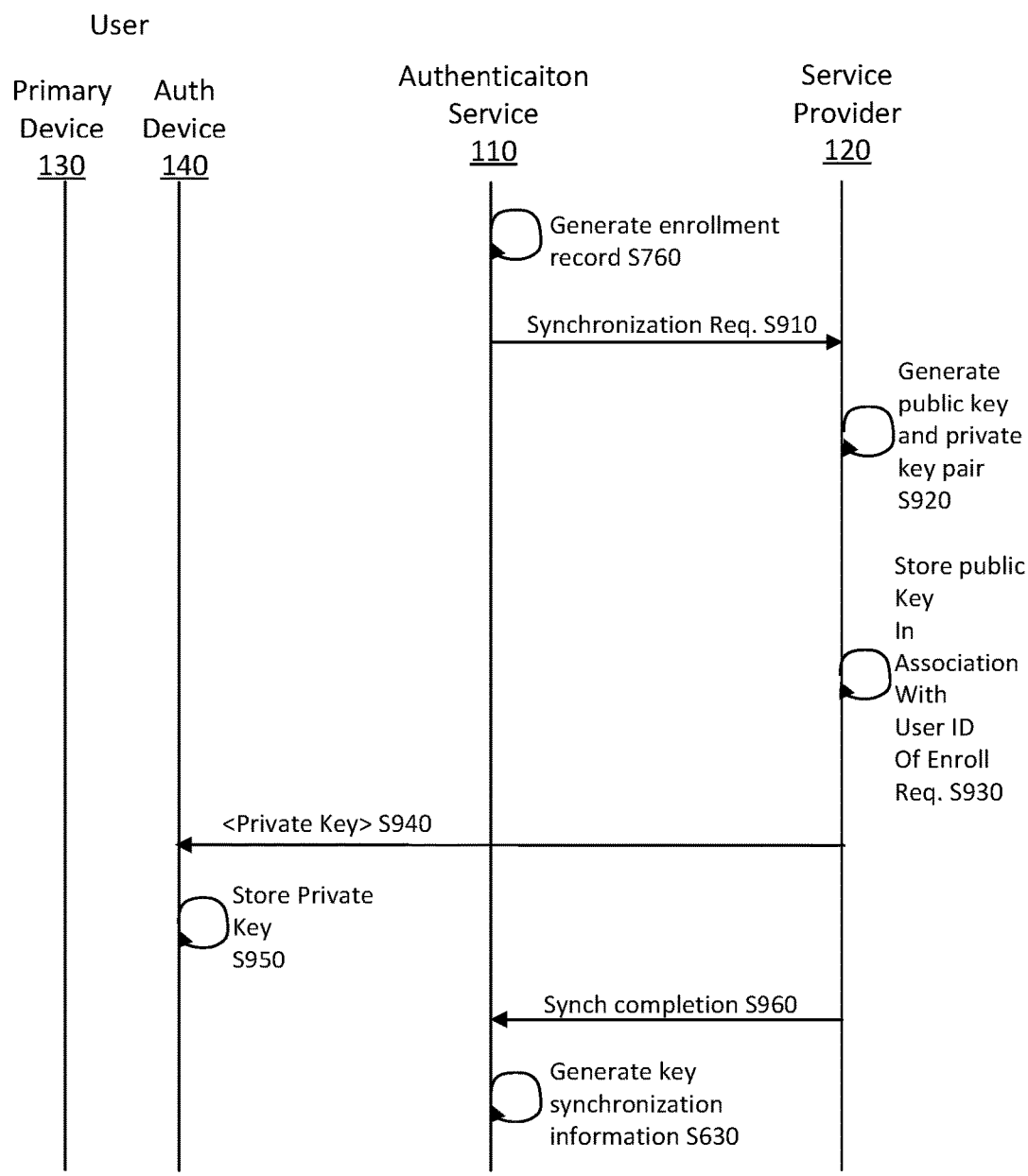
FIGS. 9A-9B are a communication flow representations of methods of embodiments.
Figure 9B:
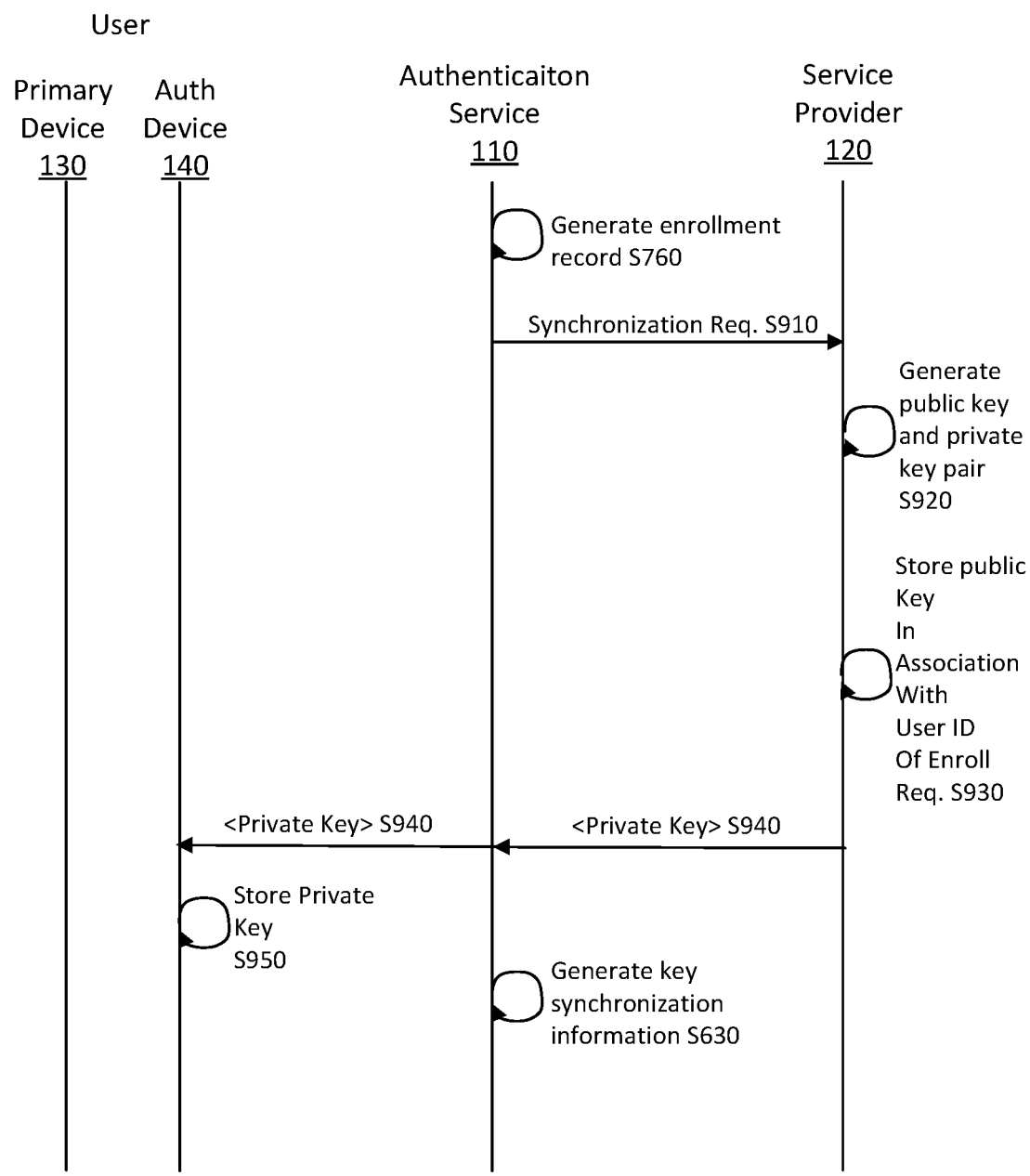
Figure 10A:
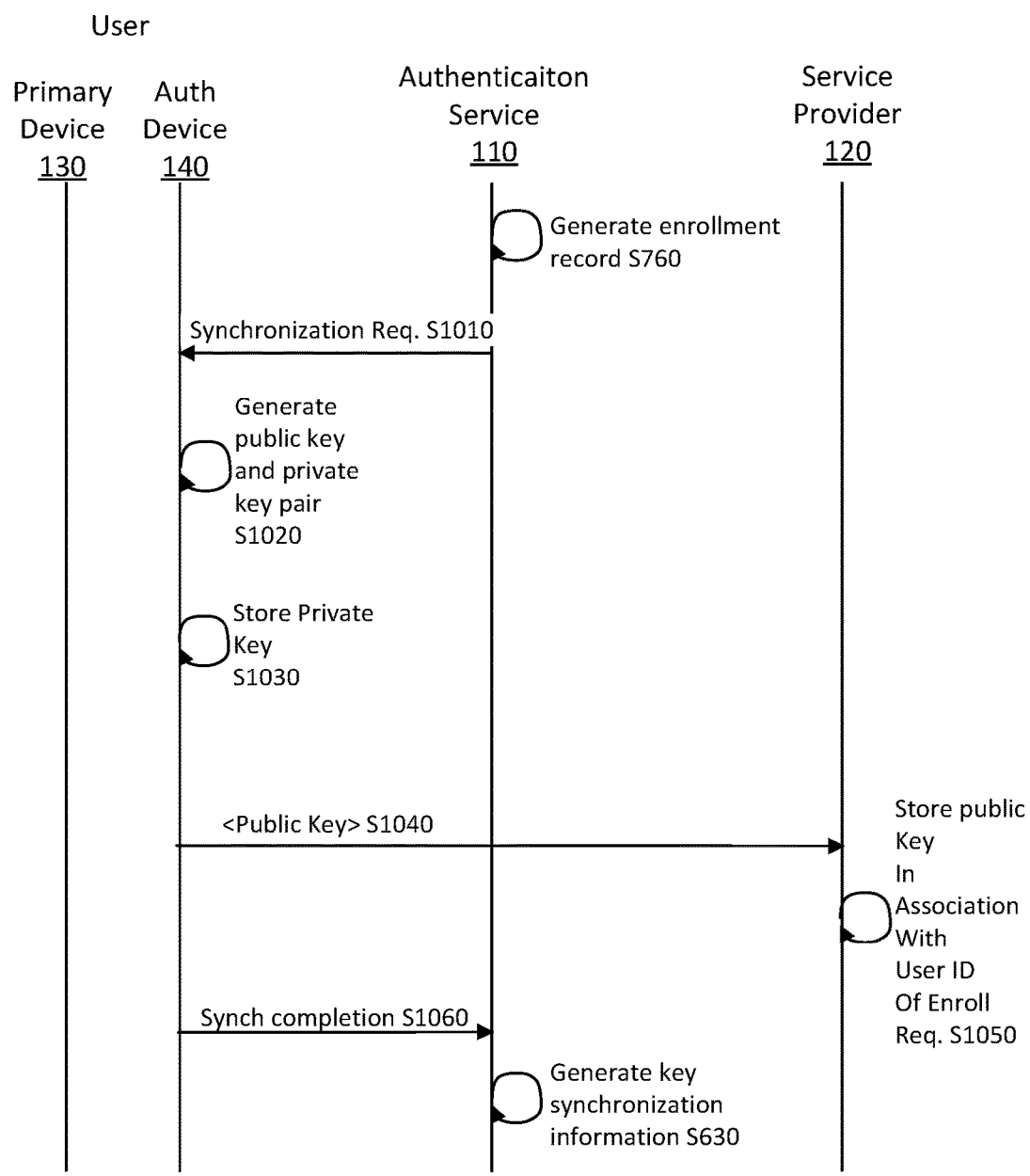
FIGS. 10A-10B are a communication flow representations of methods of embodiments.
Figure 10B:
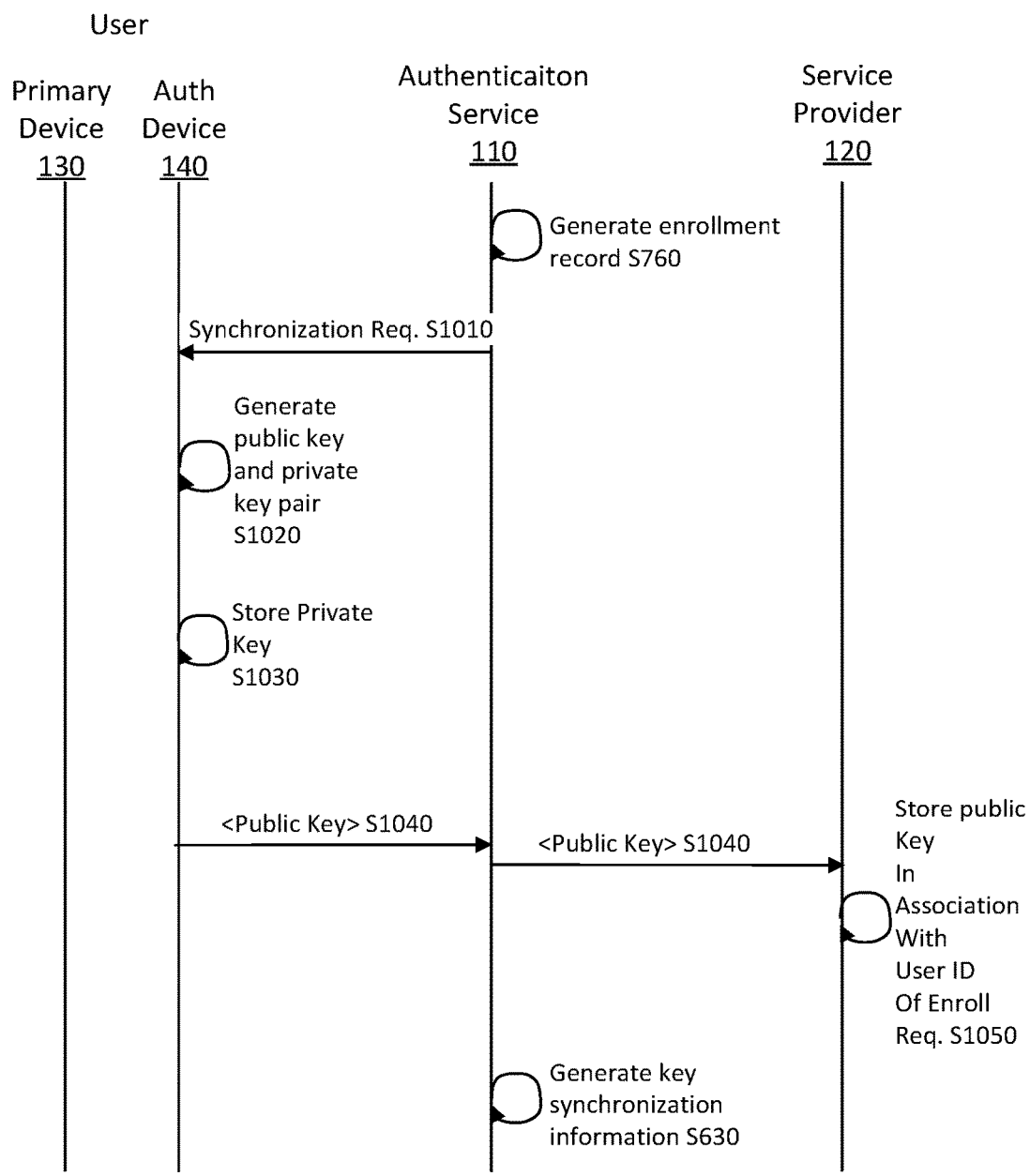

In some implementations, the authentication service 110 synchronizes the keys (process S620) (e.g., as shown in FIG. 8). In some implementations, the service provider 120 synchronizes the keys (process S620) (e.g., as shown in FIGS. 9A-9B). In some implementations, the authentication device 140 synchronizes the keys (process S620) (e.g., as shown in FIGS. 10A-10B).

In some implementations, the authentication service 110 generates the key synchronization information (process S630) and stores the generated key synchronization information (process S640).

Methods: Enrollment

In some implementations, enrollment is initiated (process S610 of FIG. 6) responsive to enrolment information provided by at least one of the authentication device 110, the primary device 130, and the service provider 120. In some implementations, the enrollment information includes the user identifier, address information of the authentication device (e.g., the authentication device 140), and information identifying the service provider (e.g., the service provider 120). In some implementations, an enrollment record is stored at the authentication service 110. In some implementations, the enrollment record includes the address information of the authentication device and the authentication service account information for the service provider (e.g., the service provider 120) identified by the enrollment information. In some embodiments, the synchronization information is stored at the authentication service in association with the enrollment record.

Figure 7:
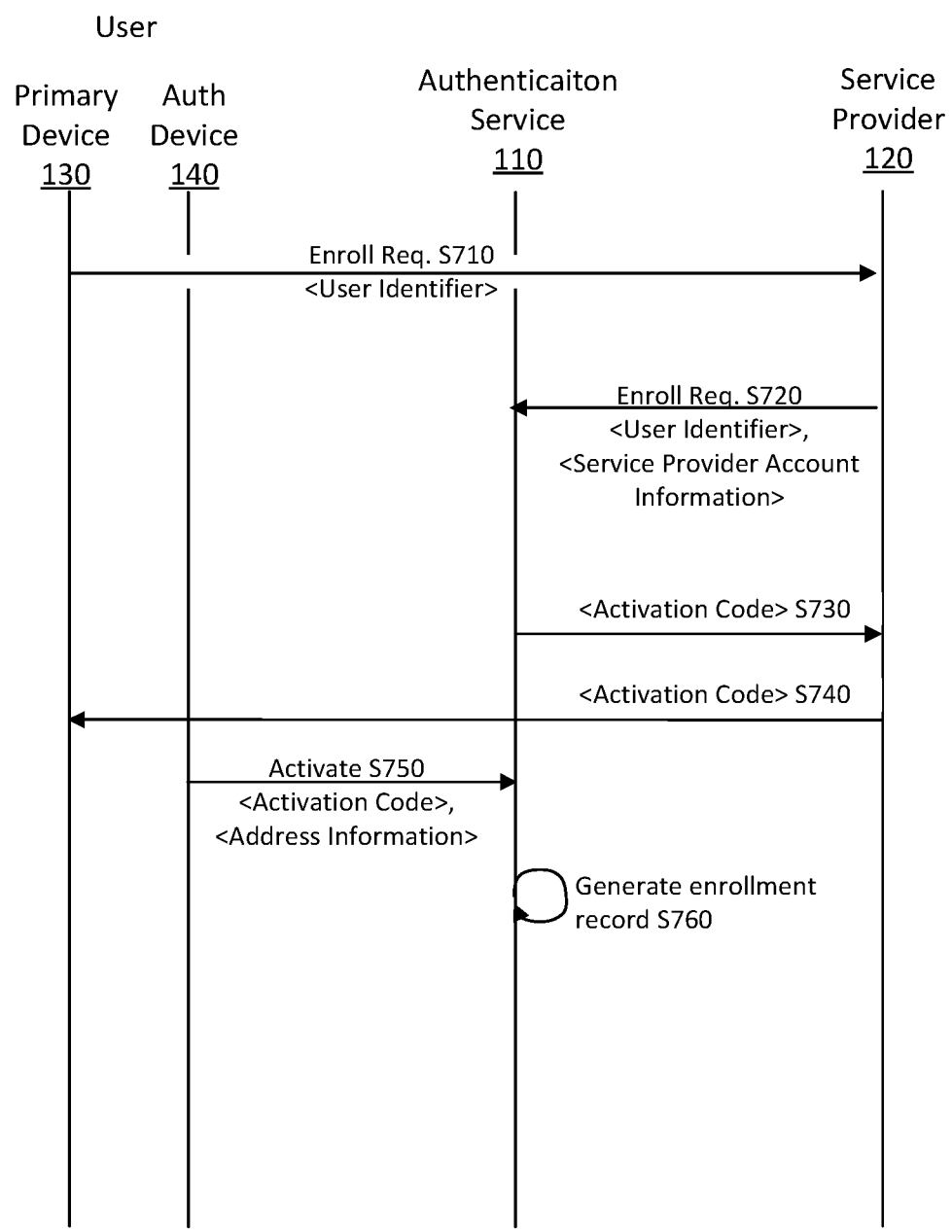
FIG. 7 is a communication flow representation of a method of an embodiment.

A method for enrollment of an authentication device in accordance with an example embodiment is shown in FIG. 7.

At process S710, the primary device 130 provides an enrollment request to the service provider 120. The enrollment request provided by the primary device 130 specifies a user identifier of a user account of the service provider. Responsive to the enrollment request at process S710, the service provider 120 provides an enrollment request to the authentication service 110 (process S720). The enrollment request provided by the service provider 120 specifies the user identifier provided by the primary device 130 at the process S710. The enrollment request provided by the service provider 120 also specifies authentication service account information for the service provider 120. In some implementations, the authentication service account information specifies an account identifier of the service provider's authentication account at the authentication service 110.

At the process S730, responsive to the enrollment request at the process S720, the authentication service 110 provides an activation code to the service provider 120. The activation code is associated with the enrollment request, and is used by the authentication device 140 to enroll the authentication device in association with the enrollment request.

At the process S740, the service provider 120 provides the activation code to the primary device 130. In some embodiments, the primary device displays the activation code, and the authentication device 140 obtains the activation code by capturing an image of the activation code by using an image capture device of the authentication device. For example, the primary device can display the activation code as a QR code that is captured by a camera of the authentication device. In some embodiments, the primary device displays the activation code, and the authentication device 140 obtains the activation code by user input received via a user input device of the authentication device. For example, a user of the primary device can view the activation code displayed by the primary device 130 and input the activation code to the authentication device 140 by using a user input device of the authentication device 140.

In some implementations, the service provider 120 provides the activation code to the authentication device 140. For example, the service provider can provide the activation code to the authentication device 140 via a message (e.g., an SMS message, an MMS message, and the like).

At the process S750, the authentication device has received the activation code, and provides an activation request to the authentication service 110. In some implementations, the activation request specifies the activation code and address information of the authentication device 140.

Figure 11:
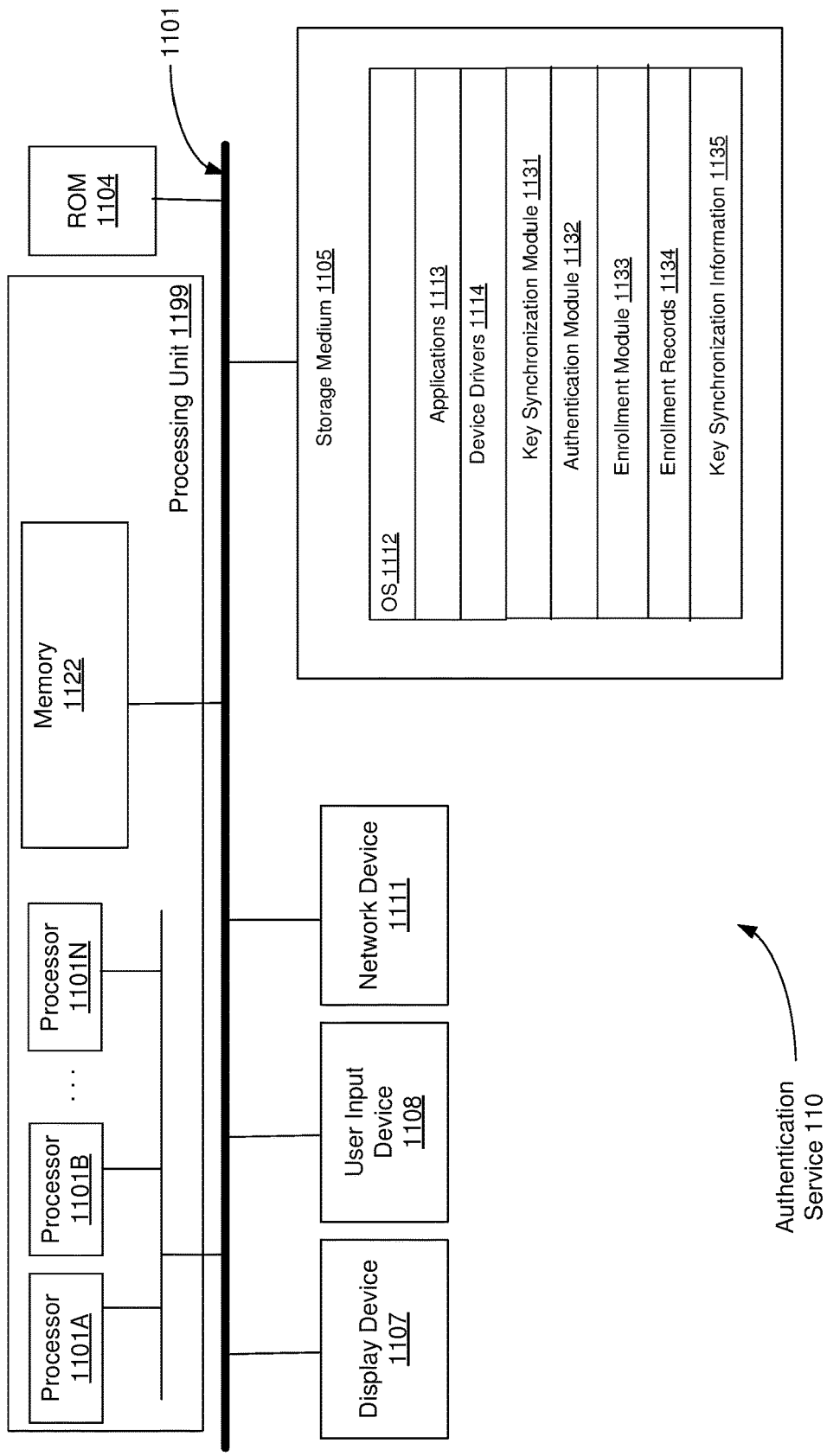
FIG. 11 is an architecture diagram of an embodiment.

At the process S760, responsive to the activation request of the process S750, the authentication service 110 generates an enrollment record (e.g., an enrollment record of the enrollment records 1134 of FIG. 11) for enrollment of the authentication device 140 for the service provider 120. In some implementations, the authentication service 110 determines that the activation code received from the authentication device 140 at the process S750 matches the activation code provided to the service provider 120 at the process S730. Responsive to the determination that the activation code at the process S750 matches the activation code at the process S730, the authentication service 110 associates the address information received at the process S750 with the user identifier and the service provider account information corresponding to the activation code, namely the user identifier and the service provider account information received by the service provider 120 at the process S720. The authentication service 110 generates the enrollment record to specify the address information received at the process S750 with the user identifier and the service provider account information corresponding to the activation code, and stores the enrollment record at the authentication service 110 (e.g., as an enrollment record of the enrollment records 1134 of FIG. 11).

In some implementations, the enrollment request provided by the primary device 130 at the process S710 specifies the address information of the authentication device 140, and the service provider 120 specifies the address information in the enrollment request provided to the authentication service 110 at the process S720.

Methods: Key Synchronization

In some implementations, the private key is synchronized (process S620) during enrollment (process S610 of FIG. 6) of the authentication device. In some implementations, the private key is synchronized (process S620) responsive completion of enrollment (process S610) of the authentication device.

In some implementations, the authentication service synchronizes the private key stored by the authentication device with the public key stored at the service provider.

A method for synchronization by the authentication service in accordance with an example embodiment is shown in FIG. 8.

As shown in FIG. 8, the process S810 is performed responsive to generation of the enrollment record at the process S760 of FIG. 7.

At process S810, the authentication service 110 generates a key pair that includes the public key and the private key.

At process S820, the authentication service 110 provides the private key to the authentication device 140, and provides the public key to the service provider 120. In some implementations, the authentication service 110 provides the private key in a response to the activation request received from the authentication service 110 at the process S750 of FIG. 7. In some implementations, the authentication service 110 provides the public key to the service provider identified by the enrollment record generated at the process S760 of FIG. 7. In some implementations, the authentication service 110 uses the activation code received at the process S750 of FIG. 7 to determine which service provider to send the public key to at the process S820.

At process S830, the service provider stores the public key received from the authentication service in association with the user identifier of the enrollment request provided to the authentication service 110 at the process S720 of FIG. 7. In some implementations, at the process S820, the authentication service provides the public key to the service provider 120 along with the user identifier corresponding to the enrollment record of the process S760. In some implementations, at the process S820, the authentication service provides the public key to the service provider 120 along with the user identifier corresponding to the activation code of the process S750 of FIG. 7. In some implementations, at the process S830, the service provider 120 stores the public key received from the authentication service 110 at the process S820 in association with the user identifier received from the authentication service 110 at the process S820.

At process S830, the authentication device 140 stores the private key received from the authentication service 110. In some implementations, the authentication device stores the private key received from the authentication service in association with the user identifier of the enrollment request provided to the authentication service 110 at the process S720 of FIG. 7. In some implementations, at the process S820, the authentication service provides the private key to the authentication device 140 along with the user identifier corresponding to the enrollment record of the process S760. In some implementations, at the process S820, the authentication service provides the private key to the authentication device 140 along with the user identifier corresponding to the activation code of the process S750 of FIG. 7. In some implementations, at the process S830, the authentication device 140 stores the private key received from the authentication service 110 at the process S820 in association with the user identifier received from the authentication service 110 at the process S820.

In some implementations, after providing the public key of the generated key pair to the service provider 120 and providing the private key of the generated key pair to the authentication device 140 (process S820), the authentication service 110 generates the key synchronization information (e.g., the process S630 of FIG. 6) and stores the key synchronization information (e.g., the process S640 of FIG. 6).

In some implementations, the service provider (e.g., 120) synchronizes the private key stored by the authentication device with the public key stored at the service provider.

A method for synchronization by the service provider in accordance with example embodiments is shown in FIGS. 9A and 9B.

As shown in FIGS. 9A and 9B, the process S910 is performed responsive to generation of the enrollment record at the process S760 of FIG. 7.

At process S910, the authentication service 110 provides a synchronization request to the service provider 120.

In some implementations, the authentication service 110 provides the synchronization request to the service provider identified by the enrollment record generated at the process S760 of FIG. 7. In some implementations, the authentication service 110 uses the activation code received at the process S750 of FIG. 7 to determine which service provider to send the synchronization request to at the process S910.

In some implementations, at the process S910, the authentication service provides the synchronization request to the service provider 120 along with the user identifier corresponding to the enrollment record of the process S760. In some implementations, at the process S910, the authentication service provides the synchronization request to the service provider 120 along with the user identifier corresponding to the activation code of the process S750 of FIG. 7.

In some implementations, at the process S910, the authentication service provides the synchronization request to the service provider 120 along with the address information corresponding to the enrollment record of the process S760. In some implementations, at the process S910, the authentication service provides the synchronization request to the service provider 120 along with the address information corresponding to the activation request of the process S750 of FIG. 7.

At the process S920, the service provider 120 generates a key pair that includes the public key and the private key, responsive to the synchronization request of the process S910.

At process S930, the service provider 120 stores the public key generated at the process S920 in association with the user identifier of the enrollment request provided to the authentication service 110 at the process S720 of FIG. 7. In some implementations, the service provider 120 stores the generated public key in association with a user identifier specified in the synchronization request received from the authentication service 110 at the process S910.

At the process S940, the service provider 120 provides the private key to the authentication device 140. In some implementations, the service provider 120 provides the private key to the authentication device 140 along with the user identifier used at the process S930.

At process S950, the authentication device 140 stores the private key received from the service provider 120. In some implementations, the authentication device stores the private key received from the service provider 120 in association with the user identifier of the enrollment request provided to the authentication service 110 at the process S720 of FIG. 7. In some implementations, at the process S940, the service provider 120 provides the private key to the authentication device 140 along with the user identifier corresponding to the enrollment record of the process S760. In some implementations, at the process S950, the authentication device 140 stores the private key received from the service provider 120 at the process S940 in association with the user identifier received from the service provider 120 at the process S940.

As shown in FIG. 9A, in some implementations, the service provider provides the private key to the authentication device (e.g., 140) identified by address information specified in the synchronization request of the process S910. In some implementations, responsive to providing the private key to the authentication device 140, the service provider 120 provides a synchronization completion to the authentication service 110 (process S960). In some implementations, the service provider 120 provides the synchronization completion to the authentication service 110 as a response to the synchronization request of the process S910. In some implementations, responsive to the synchronization completion, the authentication service 110 generates the key synchronization information (e.g., the process S630 of FIG. 6) and stores the key synchronization information (e.g., the process S640 of FIG. 6).

As shown in FIG. 9B, in some implementations, the service provider provides the private key to the authentication service 110 as a response to the synchronization request of the process 910. In some implementations, responsive to the synchronization response from the service provider 120, the authentication service 110 identifies the authentication device based on the enrollment record corresponding to the synchronization request (e.g., the enrollment record of the process S760), and the authentication service provides the private key to the authentication device (e.g., 140) identified by the enrollment record. In some implementations, responsive reception of the private key from the service provider 120, the authentication service 110 generates the key synchronization information (e.g., the process S630 of FIG. 6) and stores the key synchronization information (e.g., the process S640 of FIG. 6).

In some implementations, the authentication device synchronizes the private key stored by the authentication device with the public key stored at the service provider.

A method for synchronization by the authentication device in accordance with example embodiments is shown in FIGS. 10A and 10B.

As shown in FIGS. 10A and 10B, the process S1010 is performed responsive to generation of the enrollment record at the process S760 of FIG. 7.

At process S1010, the authentication service 110 provides a synchronization request to the authentication device 140.

In some implementations, the authentication service 110 provides the synchronization request to the authentication device 140 as a response to the activation request of the process S750 of FIG. 7.

In some implementations, at the process S1010, the authentication service provides the synchronization request to the authentication device 140 along with the user identifier corresponding to the enrollment record of the process S760. In some implementations, at the process S1010, the authentication service provides the synchronization request to the authentication device 140 along with the user identifier corresponding to the activation code of the process S750 of FIG. 7.

In some implementations, at the process S1010, the authentication service provides the synchronization request to the authentication device 140 along with address information of the service provider corresponding to the enrollment record of the process S760. In some implementations, at the process S1010, the authentication service provides the synchronization request to the authentication device 140 along with address information of the service provider corresponding to the enrollment request of the process S720 of FIG. 7.

At the process S1020, the authentication device 140 generates a key pair that includes the public key and the private key, responsive to the synchronization request of the process S1010.

At process S1030, the authentication device 140 stores the private key generated at the process S1020. In some implementations, the authentication device 140 stores the private key in association with the user identifier of the enrollment request provided to the authentication service 110 at the process S720 of FIG. 7. In some implementations, the authentication device 140 stores the generated private key in association with a user identifier specified in the synchronization request received from the authentication service 110 at the process S1010.

At the process S1040, the authentication device 140 provides the public key to the service provider 120. In some implementations, the authentication device 140 provides the public key to the service provider 120 along with the user identifier used at the process S1030. In some implementations, the authentication device 140 provides the public key to the service provider 120 along with a user identifier specified in the synchronization request received from the authentication service 110 at the process S1010.

At process S1050, the service provider 120 stores the public key received from authentication device 140. In some implementations, the service provider 120 stores the public key received from the authentication device 140 in association with the user identifier of the enrollment request provided to the authentication service 110 at the process S720 of FIG. 7. In some implementations, at the process S1040, the authentication device 140 provides the public key to the service provider 120 along with the user identifier corresponding to the enrollment record of the process S760. In some implementations, at the process S1050, the service provider 120 stores the public key received from the authentication device 140 at the process S1040 in association with a user identifier received from the authentication device 140 at the process S1040.

As shown in FIG. 10A, in some implementations, the authentication device 140 provides the public key to the service provider 120 (e.g., identified by address information specified in the synchronization request of the process S1010). In some implementations, responsive to providing the public key to the service provider 120, the authentication device 140 provides a synchronization completion to the authentication service 110 (process S1060). In some implementations, the authentication device 140 provides the synchronization completion to the authentication service 110 as a response to the synchronization request of the process S1010. In some implementations, responsive to the synchronization completion, the authentication service 110 generates the key synchronization information (e.g., the process S630 of FIG. 6) and stores the key synchronization information (e.g., the process S640 of FIG. 6).

As shown in FIG. 10B, in some implementations, the authentication device 140 provides the public key to the authentication service 110 as a response to the synchronization request of the process 910. In some implementations, responsive to the synchronization response from the authentication device 140, the authentication service 110 identifies the service provider 120 based on the enrollment record corresponding to the synchronization request (e.g., the enrollment record of the process S760), and the authentication service 110 provides the public key to the service provider (e.g., 120) identified by the enrollment record. In some implementations, responsive reception of the public key from the authentication device 140, the authentication service 110 generates the key synchronization information (e.g., the process S630 of FIG. 6) and stores the key synchronization information (e.g., the process S640 of FIG. 6).

Methods: Providing an Authentication Request to a Synchronized Device

Reverting to FIG. 5, process S520, which includes determining at least one authentication device and providing the authentication request to at least one determined authentication device, is performed by the authentication service 110 responsive to an authentication request provided by the service provider (e.g., 120) to the authentication service 110 for the user identifier.

The authentication service 110 determines at least one authentication device (e.g., 140) for the user identifier that stores a private key that is synchronized with the service provider 120 by using the key synchronization information (e.g., the key synchronization generated at the process S630 of FIG. 6), and the authentication service 110 provides the authentication request to at least one determined authentication device (e.g., 140).

In some embodiments, determining at least one authentication device and providing the authentication request to at least one determined authentication device includes: mapping the authentication request to at least one authentication device identified by the key synchronization information as storing the synchronized private key, and providing the authentication request to the mapped at least one authentication device. In some embodiments, the authentication request is provided by the service provider, and the authentication request is for a request received at the service provider from a primary device associated with the user identifier. In some embodiments, the authentication request specifies the user identifier.

In some implementations, the request received at the service provider from the primary device is at least one of a login request, a financial transaction request, a purchase transaction request, an account management request, and a service provider management request.

In some embodiments, the authentication request includes encrypted data that is encrypted by the service provider 120 by using the public key of the key pair synchronized with the authentication device 140 associated with the user identifier specified in the authentication request (e.g., the public key synchronized at the process S620 of FIG. 6), and the authentication device (e.g., 140) determined at the process S520 decrypts the encrypted data of the authentication request by using the synchronized private key (e.g., the private key synchronized at the process S620 of FIG. 6).

In some implementations, a plurality of authentication devices (e.g., 140) are enrolled for the user identifier at the authentication service 110, and the authentication service 110 determines one or more authentication devices (e.g., 140) for the user identifier that stores a private key that is synchronized with the service provider 120 by using the key synchronization information (e.g., the key synchronization information generated at the process S630 of FIG. 6), and the authentication service 110 provides the authentication request to each determined authentication device.

In some implementations, the plurality of authentication devices include at least a primary authentication device and at least one fallback authentication device, and in a case where the authentication service cannot establish communication with the primary authentication device, the authentication service 110 provides the authentication request to the fallback authentication device.

In some implementations, the authentication service 110 provides the authentication request to one or more of a plurality of authentication devices enrolled for the user identifier based on at least one of a user identifier profile at the authentication service 110 and a service provider profile 120 at the authentication service. In some implementations, the authentication service 110 provides the authentication request to one or more of a plurality of authentication devices enrolled for the user identifier based on priority values for each authentication device as indicated by at least one of a user identifier profile at the authentication service 110 and a service provider profile 120 at the authentication service.

Methods: Authentication Response

In some embodiments, the process S530 of FIG. 5, which includes providing an authentication response signed by the at least one determined authentication device to the service provider, is performed responsive to an authentication response provided by an authentication device (e.g., 140) corresponding to the user identifier of the authenticating request. The authentication response is generated by the authentication device 140 responsive to the authentication request received by the authentication device 140 at the process S520. The authentication device 140 signs the generated authentication response by using the synchronized private key (e.g., the private key synchronized at the process S620 of FIG. 6). In some implementations, the authentication device stores the synchronized private key in association with information identifying the service provider 120 that stores the corresponding synchronized public key.

In some embodiments, providing an authentication response signed by the at least one determined authentication device to the service provider includes: receiving a signed authentication response from the authentication device (e.g., 140), the signed authentication response being signed with the private key by the authentication device; and providing the signed authentication response to the service provider.

The service provider 120 verifies the signed authentication response by using the synchronized public key (e.g., the public key synchronized at the process S620 of FIG. 6).

In some embodiments, the authentication response received by the authentication service from the authentication device includes encrypted data that is encrypted by the authentication device (e.g., 140) by using a public key received during enrollment of the authentication device at the authentication service 110 for the user identifier of the service provider. In some implementations, the public key used to encrypt data at the authentication device is a public key of the service provider 120; the authentication service 110 provides the public key and information identifying the corresponding service provider 120 to the authentication device during enrollment of the authentication device for a user identifier of the service provider 120; the authentication device stores the public key of the service provider 120 in association with information identifying the service provider 120; the authentication request identifies the service provider 120 based on information of the authentication request; and the authentication device encrypts the authentication response by using the public key corresponding to the service provider 120 identified by the authentication request.

In some implementations, the service provider 120 decrypts the encrypted authentication response by using a private key that corresponds to the public key used by the authentication device to encrypt the authentication response. In some implementations, the public key is a public key of the service provider 120 that is stored by the service provider 120.

In some embodiments, providing an authentication response signed by the at least one determined authentication device to the service provider includes: at the authentication service 110, performing a security analysis of the signed authentication response, and providing security information resulting from the security analysis to the service provider. In some implementations, the service provider uses the security information to verify the signed authentication response. In some implementations, the security information indicates at least one of: abnormal behavior patterns detected during the security analysis; fraudulent behavior patterns detected during the security analysis; and at least one security vulnerability assessment of the at least one determined authentication device.

In some implementations, the signed authentication response indicates at least one of a confirmation result, a cancellation result and a fraud result.

In some implementations, the authentication service 110 provides the signed authentication response to the service provider 120 in a response to the authentication request received from the service provider (e.g., at the process S520).

In some implementations, the authentication service 110 provides the signed authentication response to the service provider in a response to an authentication status request received from the service provider 120.

System Architecture: Authentication Service

FIG. 11 is an architecture diagram of an authentication service (e.g., the authentication service 110 of FIGS. 1-4 and 7-10) according to an implementation in which the authentication service is implemented in a system that includes a server device. In some implementations, the authentication service 110 is implemented in a system that includes a plurality of devices.

The bus 1101 interfaces with the processors 1101A-1101N, the main memory (e.g., a random access memory (RAM)) 1122, a read only memory (ROM) 1104, a processor-readable storage medium 1105, a display device 1107, a user input device 1108, and a network device 1111.

The processors 1110A-1101N may take many forms, such as ARM processors, X86 processors, and the like.

In some implementations, the system of the authentication service 110 includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a key synchronization module 1131, an authentication module 1132, and an enrollment module 1133.

The network adapter device 1111 provides one or more wired or wireless interfaces for exchanging data and commands between the system of the authentication service 110 and other devices, such as the authentication device 140 and devices and servers of service providers, e.g., the service provider 120. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1105 includes an operating system 1112, software programs 1113, device drivers 1114, the key synchronization module 1131, the authentication module 1132, the enrollment module 1133, enrollment records 1134, and key synchronization information 1135.

In some implementations, the key synchronization module 1131 includes machine-executable instructions that when executed by the processing unit 1199 perform the processes S810, S820 and S630 of FIG. 8, and the process S640 of FIG. 6. In some implementations, the enrollment module 1133 includes machine-executable instructions that when executed by the processing unit 1199 perform the processes S730, and S760 of FIG. 7. In some implementations, the authentication module 1132 includes machine-executable instructions that when executed by the processing unit 1199 perform the processes S510, S520 and S530 of FIG. 5. In some implementations, the enrollment records 1134 include enrollment records generated at the process S760 of FIG. 7. In some implementations, the key synchronization information 1135 includes the key synchronization information generated at the process S630 of FIG. 6.

System Architecture: Authentication Device

Figure 12:
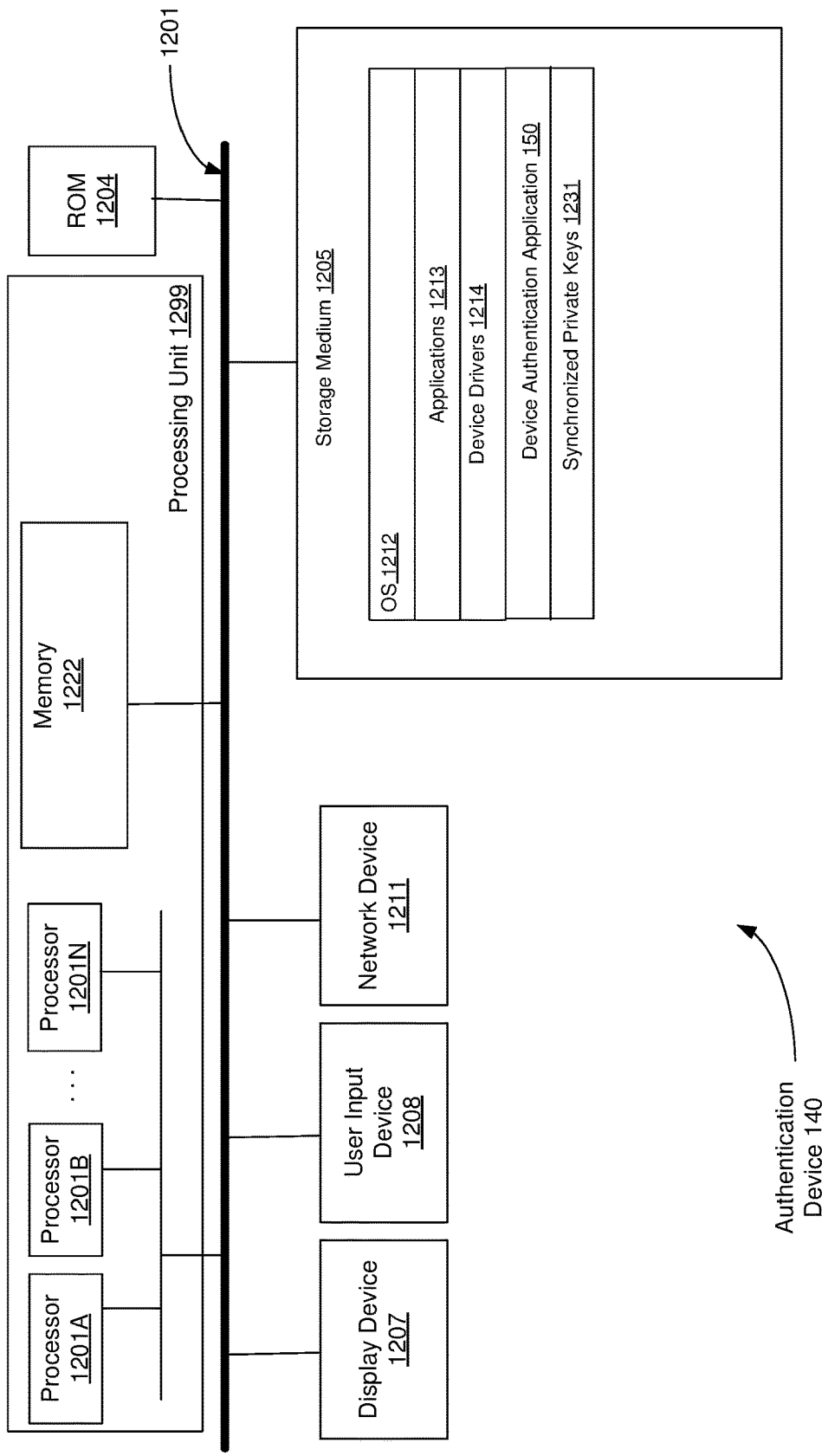
FIG. 12 is an architecture diagram of an embodiment.

FIG. 12 is an architecture diagram of an authentication device (e.g., the authentication device 140 of FIGS. 1-4 and 7-10) according to an implementation.

The bus 1201 interfaces with the processors 1201A-1201N, the main memory (e.g., a random access memory (RAM)) 1222, a read only memory (ROM) 1204, a processor-readable storage medium 1205, a display device 1207, a user input device 1208, and a network device 1211.

The processors 1201A-1201N may take many forms, such as ARM processors, X86 processors, and the like.

In some implementations, the authentication device 140 includes at least one of a central processing unit (processor) and a multi-processor unit (MPU).

The processors 1201A-1201N and the main memory 1222 form a processing unit 1299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes the device authentication application 150.

The network adapter device 1211 provides one or more wired or wireless interfaces for exchanging data and commands between the authentication device 140 and other devices, such as a server of the authentication service 110 and devices and servers of service providers, e.g., the service provider 120. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1222 (of the processing unit 1299) from the processor-readable storage medium 1205, the ROM 1204 or any other storage location. During execution of these software programs, the respective machine-executable instructions are accessed by at least one of processors 1201A-1201N (of the processing unit 1299) via the bus 1201, and then executed by at least one of processors 1201A-1201N. Data used by the software programs are also stored in the memory 1222, and such data is accessed by at least one of processors 1201A-1201N during execution of the machine-executable instructions of the software programs. The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1205 includes an operating system 1212, software programs 1213, device drivers 1214, the authentication application 150, and synchronized private keys 1231.

In some implementations, the authentication application 150 includes machine-executable instructions that when executed by the processing unit 1299 perform the process S610 of FIG. 6. In some implementations, the authentication application 150 includes machine-executable instructions that when executed by the processing unit 1299 perform the process S620 of FIG. 6. In some implementations, the authentication application 150 includes machine-executable instructions that when executed by the processing unit 1299 perform the process S750 of FIG. 7. In some implementations, the authentication application 150 includes machine-executable instructions that when executed by the processing unit 1299 perform the process S830 of FIG. 8. In some implementations, the authentication application 150 includes machine-executable instructions that when executed by the processing unit 1299 perform the process S950 of FIG. 9A. In some implementations, the authentication application 150 includes machine-executable instructions that when executed by the processing unit 1299 perform the process S950 of FIG. 9B. In some implementations, the authentication application 150 includes machine-executable instructions that when executed by the processing unit 1299 perform the process S1020, S1030, and S1040 of FIGS. 10A-B. In some implementations, the authentication application 150 includes machine-executable instructions that when executed by the processing unit 1299 perform the process S1060 of FIG. 10A. In some implementations, the synchronized private keys 1231 includes the private key generated at the processes S810 of FIG. 8, S920 of FIGS. 9A-B, and S1020 of FIGS. 10A-B.

In some implementations, the authentication application 150 includes machine-executable instructions that when executed by the processing unit 1299 cause the authentication device 140 to provide the signed authentication response of the process S530 of FIG. 5.

System Architecture of a Service Provider

Figure 13:
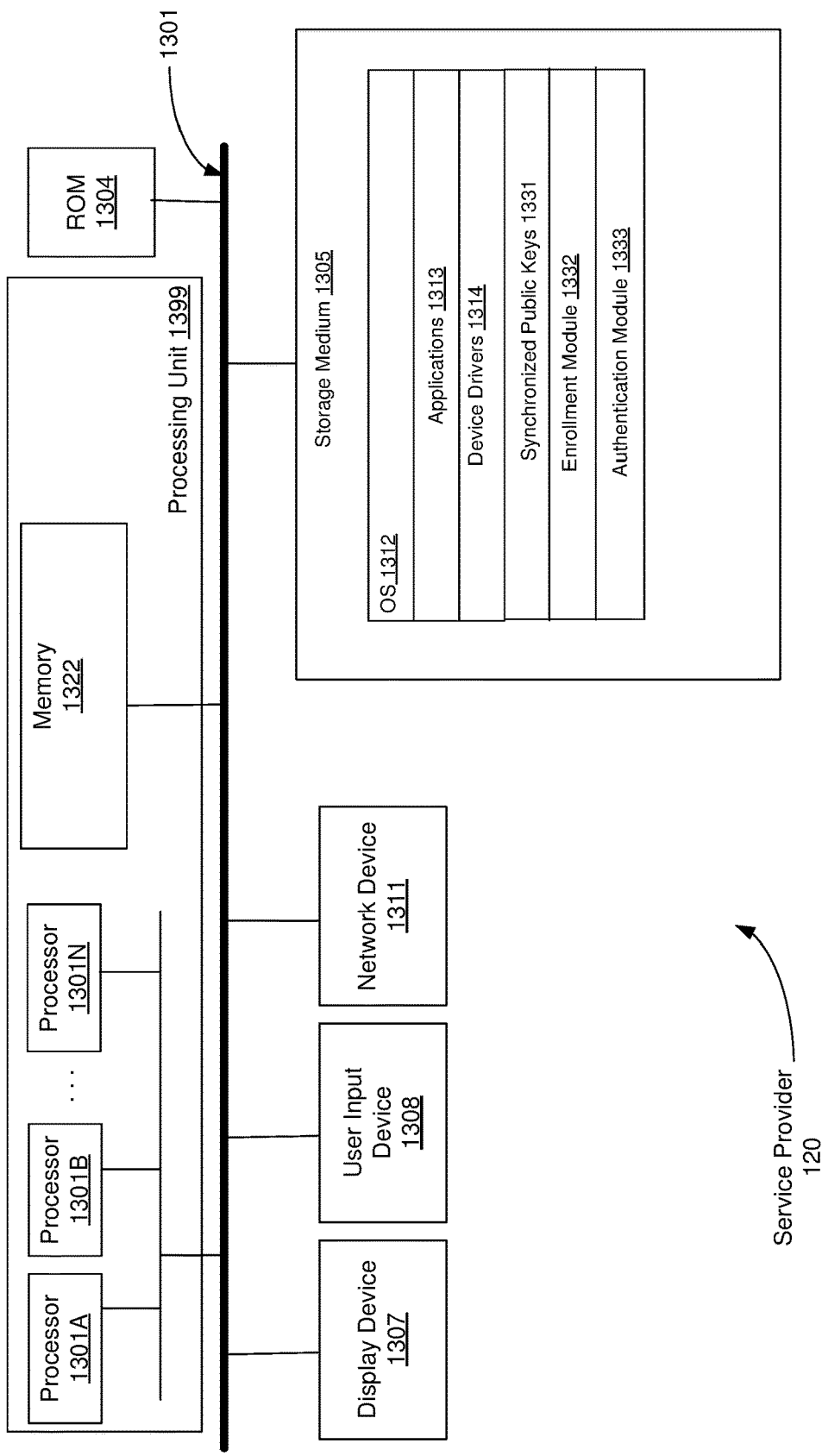
FIG. 13 is an architecture diagram of an embodiment.

FIG. 13 is an architecture diagram of a service provider (e.g., the service provider 120 of FIGS. 1-4 and 7-10) according to an implementation in which the service provider is implemented in system that includes a server device. In some implementations, the service provider is implemented in a system that includes a plurality of devices.

The bus 1301 interfaces with the processors 1301A-1301N, the main memory (e.g., a random access memory (RAM)) 1322, a read only memory (ROM) 1304, a processor-readable storage medium 1305, a display device 1307, a user input device 1308, and a network device 1311.

The processors 1301A-1301N may take many forms, such as ARM processors, X86 processors, and the like.

In some implementations, the service provider 120 includes at least one of a central processing unit (processor) and a multi-processor unit (MPU).

The processors 1301A-1301N and the main memory 1322 form a processing unit 1399. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an authentication module 1333 and an enrollment module 1332.

The network adapter device 1311 provides one or more wired or wireless interfaces for exchanging data and commands between the server of the service provider 120 and other devices, such as a server of the authentication service 110 and the authentication device 140. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1322 (of the processing unit 1399) from the processor-readable storage medium 1305, the ROM 1304 or any other storage location. During execution of these software programs, the respective machine-executable instructions are accessed by at least one of processors 1301A-1301N (of the processing unit 1399) via the bus 1301, and then executed by at least one of processors 1301A-1301N. Data used by the software programs are also stored in the memory 1322, and such data is accessed by at least one of processors 1301A-1301N during execution of the machine-executable instructions of the software programs. The processor-readable storage medium 1305 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1305 includes an operating system 1312, software programs 1313, device drivers 1314, the authentication module 1333, the enrollment module 1332 and synchronized public keys 1331.

In some implementations, the enrollment module 1332 includes machine-executable instructions that when executed by the processing unit 1399 perform the process S610 of FIG. 6. In some implementations, the enrollment module 1332 includes machine-executable instructions that when executed by the processing unit 1399 perform the process S620 of FIG. 6. In some implementations, the enrollment module 1332 includes machine-executable instructions that when executed by the processing unit 1399 perform the processes S720, and S740 of FIG. 7. In some implementations, the enrollment module 1332 includes machine-executable instructions that when executed by the processing unit 1399 perform the process S830 of FIG. 8. In some implementations, the enrollment module 1332 includes machine-executable instructions that when executed by the processing unit 1399 perform the processes S920, S930 and S940 of FIGS. 9A-B. In some implementations, the enrollment module 1332 includes machine-executable instructions that when executed by the processing unit 1399 perform the process S960 of FIG. 9A. In some implementations, the enrollment module 1332 includes machine-executable instructions that when executed by the processing unit 1399 perform the process S1050 of FIGS. 10A-B.

In some implementations, the authentication module 1333 includes machine-executable instructions that when executed by the processing unit 1399 control the service provider 120 to provide the authentication request of the process S520 of FIG. 5, and verify the signed authentication response received from the authentication service 110 at the process S530 of FIG. 5.

In some implementations, the synchronized public keys 1331 includes the public key generated at the processes S810 of FIG. 8, S920 of FIGS. 9A-B, and S1020 of FIGS. 10A-B.

Machines

Systems and methods of the preferred embodiment and variations thereof can be embodied and/or implemented at least in part as a machine configured to receive a computer-readable medium storing computer-readable instructions. The instructions are preferably executed by computer-executable components preferably integrated with the authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
at an authentication service, the authentication service being implementing by one or more computing servers:
(i) receiving from a remote service provider, via a network, an account identifier and an authentication request for authenticating a service request received at the remote service provider from an initiator, wherein the authentication request comprises an authentication challenge that is cryptographically secured with a public cryptographic key of the remote service provider;
(ii) using the account identifier to identify a predefined synchronization mapping established with the authentication service that identifies a destination of a user device having a private cryptographic key corresponding to the public cryptographic key of the remote service provider or a user application having a private cryptographic key corresponding to the public cryptographic key of the remote service provider, wherein the private cryptographic key of the destination and the public cryptographic key of the remote service provider define an asymmetric cryptographic key pair;

(iii) in response to identifying the destination based on the predefined synchronization mapping, routing by the authentication service the authentication request to the destination;

(iv) receiving from the destination an authentication response to the authentication request, the authentication response comprising a challenge response to the authentication challenge, the authentication response being cryptographically secured using the private cryptographic key of the destination; and (v) in response to receiving the authentication response from the destination, routing the authentication response to the remote service provider based on the predefined synchronization mapping.

2. The method of claim 1, wherein the cryptographically signed authentication response is signed by the destination using the private cryptographic key, and wherein, upon receipt of the cryptographically signed authentication response routed from the authentication service, the remote service provider decrypts and verifies the cryptographically signed authentication response using the public cryptographic key.

3. The method of claim 1, wherein, prior to transmitting the authentication request by the remote service provider to the authentication service, the authentication request is cryptographically signed by the remote service provider using the public cryptographic key.

4. The method of claim 1, wherein further at the authentication service:

storing a plurality of predefined synchronization mappings, wherein each predefined synchronization mapping maps the remote service provider to each of a plurality of destinations associated with different account identifiers; and using the predefined synchronization mapping associated with the account identifier to select the destination among the plurality of destination.

5. The method of claim 1, wherein further at the authentication service:

using the predefined synchronization mapping to select an authentication application residing on the authentication device as the destination; and wherein transmitting the cryptographically signed authentication request includes delivering the cryptographically signed authentication request to the authentication device via the selected authentication application.

6. The method of claim 1, wherein further at the authentication service:

responsive to synchronization of the asymmetric cryptographic keys between the remote service provider and the destination enrolled for the account identifier of the remote service provider, storing asymmetric cryptographic key synchronization information in association with address information of the destination, the account identifier, and authentication service account information for the remote service provider, the asymmetric cryptographic key synchronization information indicating that the private cryptographic key associated with the destination is synchronized with the public cryptographic key stored at the remote service provider in association with the account identifier.

7. The method of claim 6, wherein:

at least one of the authentication service, the remote service provider and the authentication device synchronizes the private cryptographic key and the public cryptographic key between the remote service provider and the destination.

8. The method of claim 1, wherein:

the asymmetric cryptographic key pair comprising the public cryptographic key of the remote service provider and the private cryptographic key of the destination is inaccessible to the authentication service.

9. A method comprising:

at an authentication service:

configuring an authentication channel via the authentication service between a service provider and a user authentication device for authenticating a service request to the service provider;

wherein:

a private cryptographic key associated with the user authentication device is synchronized with a public cryptographic key associated with the service provider during an enrollment of the user authentication device at the authentication service;

the user authentication device is enrolled responsive to enrollment information provided by at least one of the user authentication device, a primary device, and the service provider, the enrollment information including a user identifier, address information of the user authentication device, and information identifying the service provider;

an enrollment record is stored at the authentication service, the enrollment record including the enrollment information;

at least one of the authentication service, the user authentication device and the service provider synchronizes the private cryptographic key and the public cryptographic key between the user authentication device and the service provider; and information associated with the synchronization is stored at the authentication service in association with the enrollment record as cryptographic key synchronization information, the cryptographic key synchronization information indicating that an asymmetric cryptographic key pair is synchronized between the user authentication device and the service provider;

responsive to an authentication request received from the service provider for the user identifier, the authentication request comprising an authentication challenge that is cryptographically secured with the public cryptographic key of the service provider;

using the user identifier to identify the synchronization information established with the authentication service that identifies a destination of the user authentication device having the private cryptographic key corresponding to the public cryptographic key of the service provider;

in response to identifying the destination based on the synchronization information, routing by the authentication service the authentication request to the user authentication device;

receiving from the user authentication device an authentication response to the authentication request, the authentication response comprising a challenge response to the authentication challenge, the authentication response being cryptographically secured using the private cryptographic key of the destination; and in response to receiving the authentication response from the destination, routing the authentication response to the service provider based on the synchronization information.

10. The method of claim 9,
wherein the service provider decrypts and verifies the signed authentication response by using the public cryptographic key.

11. The method of claim 9,
wherein the user authentication device decrypts the authentication challenge of the authentication request by using the private cryptographic key.

12. The method of claim 9,
wherein the authentication service comprises a multi-factor authentication service that is external to and independent of the service provider, the service provider communicating with the multi-factor authentication service via a REST API, and
wherein the user authentication device includes an authentication application constructed to communicatively couple with the authentication service.

13. The method of claim 9,
wherein a plurality of user authentication devices are enrolled for the user identifier at the authentication service, the plurality of user authentication devices including at least a primary authentication device and at least one fallback authentication device, and
wherein the authentication service provides the authentication request from the service provider to the fallback authentication device when the authentication service cannot establish communication with the primary authentication device.

14. The method of claim 9,
wherein a plurality of user authentication devices are enrolled for the user identifier at the authentication service, and
wherein the authentication service provides the authentication request from the service provider to one or more of the plurality of user authentication devices based on at least one of a user identifier profile at the authentication service and a service provider profile at the authentication service.

* * * * *